US012028651B1

(12) United States Patent
Braund et al.

(10) Patent No.: US 12,028,651 B1
(45) Date of Patent: Jul. 2, 2024

(54) INTEGRATING TWO-DIMENSIONAL VIDEO CONFERENCE PLATFORMS INTO A THREE-DIMENSIONAL VIRTUAL ENVIRONMENT

(71) Applicant: KATMAI TECH INC., New York, NY (US)

(72) Inventors: Erik Stuart Braund, Saugerties, NY (US); Kristofor Bernard Swanson, Anchorage, AK (US)

(73) Assignee: KATMAI TECH INC., New York, NY (US)

( * ) Notice: Subject to any disclaimer, the term of this patent is extended or adjusted under 35 U.S.C. 154(b) by 0 days.

(21) Appl. No.: 18/370,679

(22) Filed: Sep. 20, 2023

(51) Int. Cl.
*H04N 7/15* (2006.01)
(52) U.S. Cl.
CPC .................... *H04N 7/157* (2013.01)
(58) Field of Classification Search
CPC ...................................................... H04N 7/157
USPC ............................................. 348/14.02–14.9
See application file for complete search history.

(56) References Cited

U.S. PATENT DOCUMENTS

| 2013/0212228 A1* | 8/2013 | Butler | G06T 13/40 |
| | | | 709/219 |
| 2022/0277505 A1* | 9/2022 | Baszucki | G06T 13/40 |
| 2022/0286657 A1* | 9/2022 | Oz | H04N 7/157 |

* cited by examiner

*Primary Examiner* — Maria El-Zoobi
(74) *Attorney, Agent, or Firm* — Sterne, Kessler, Goldstein & Fox P.L.L.C.

(57) ABSTRACT

Disclosed herein are aspects for integrating a two-dimensional video conference into a three-dimensional virtual environment. An aspect begins by rendering the virtual environment, including a first avatar. The virtual environment is rendered on a first device, belonging to a first user, and from a perspective of a first virtual camera controlled by the first user. The first avatar represents the first user at a location of the first virtual camera. The aspect then provides operations for connecting the user in the 3D virtual environment with a video conferencing platform (VCP) server to connect to a video conference hosted by the VCP server. The aspect continues by transmitting and receiving video and audio data to and from the VCP server. The aspect concludes by rendering the received audio and video data into the 3D virtual environment.

20 Claims, 16 Drawing Sheets

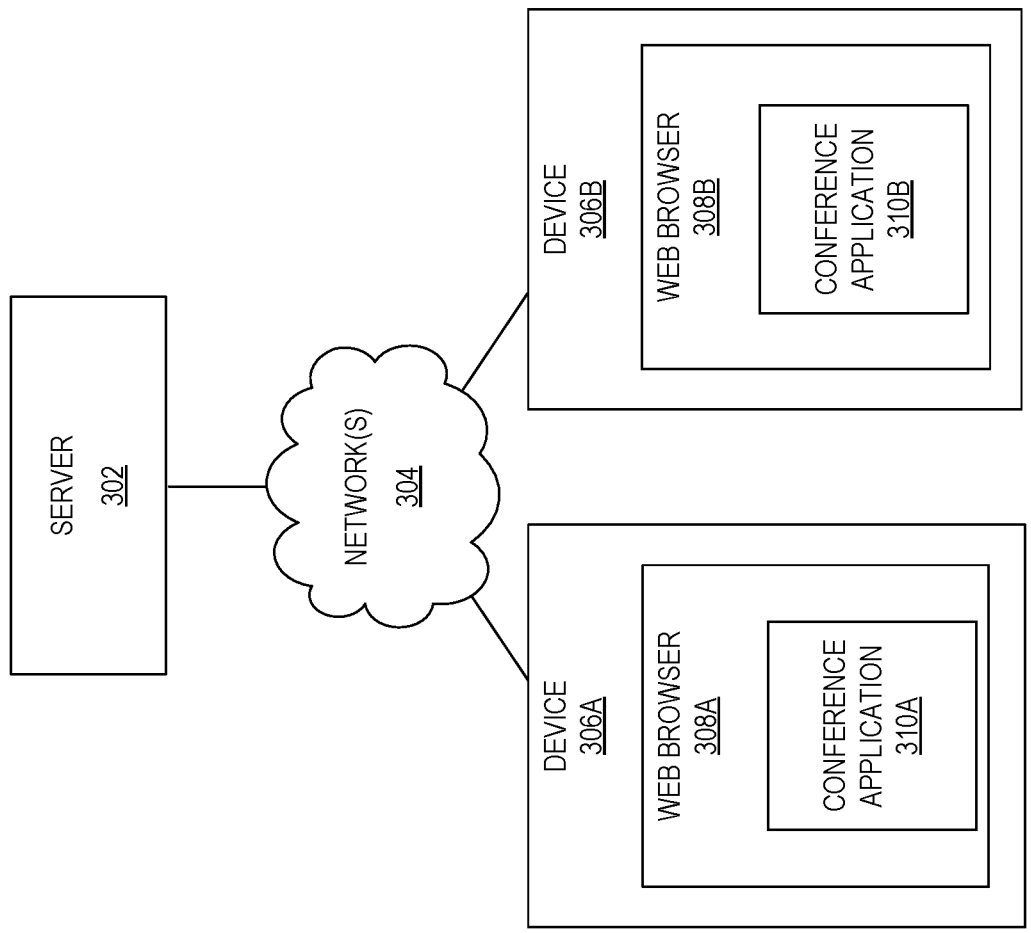

INTEGRATING TWO-DIMENSIONAL VIDEO CONFERENCE PLATFORMS INTO A THREE-DIMENSIONAL VIRTUAL ENVIRONMENT

BACKGROUND

Technical Field

Aspects of the present disclosure relate to components, systems, and methods for integrating one or more video conferencing platforms into one video conference.

Related Art

Video conferencing involves the reception and transmission of audio-video signals by users at different locations for communication between people in real time. Video conferencing is widely available on many computing devices from a variety of different services, including the ZOOM service available from Zoom Communications Inc. of San Jose, CA. Some video conferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user devices.

Many of these video conferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, video conferencing technology has gained importance. Especially since the COVID-19 pandemic, many workplaces, trade shows, meetings, conferences, schools, and places of worship are now taking place at least partially online. Virtual conferences using video conferencing technology are increasingly replacing physical conferences. In addition, this technology provides advantages over physically meeting to avoid travel and commuting.

However, often, use of this video conferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional video conferences.

Moreover, when the conference starts to get several participants, additional problems occur with these video conferencing technologies. Where with physical meeting conferences people are able to gather in an area or a conference room to effectively interact with one another, virtual conferences often limit the ability to see or hear all participants. Even when all participants can be seen or heard in the virtual world, there may be a problem finding natural spacing or ordering amongst the participants.

Further in physical meeting conferences, people can have side interactions. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many. Here, too, virtual conferences lose an opportunity for participants to create social connections and to communicate and network more effectively.

Massively multiplayer online games (MMOG or MMO) often allow players to navigate avatars around a virtual world. Sometimes these MMOs allow users to speak with one another or send messages to one another. Examples include the ROBLOX game available from Roblox Corporation of San Mateo, CA and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable in video conferences. Some publications may describe having video placed on an avatar in a virtual world. However, these systems typically require specialized software and have other limitations to their usefulness.

Improved methods are needed for video conferencing.

SUMMARY

In an aspect, a computer-implemented method provides for integrating a three-dimensional (3D) virtual environment with a video conferencing platform. The method begins by rendering the 3D virtual environment, including a first avatar. The 3D virtual environment is rendered on a first device, belonging to a first user, and from a perspective of a first virtual camera controlled by the first user. The first avatar in the 3D virtual environment represents the first user at a location of the first virtual camera. The method continues by connecting to a video conferencing platform (VCP) server to connect to a video conference hosted by the VCP server. Video and audio data captured by the first device is transmitted to the VCP server. The VCP server is connected to a second device through a conference application. The conference application renders video data for conference participants. Audio and video data collected from the conference application is received from the VCP server. The method concludes by rendering the received audio and video data in the 3D virtual environment.

In a further embodiment, a method is provided for integrating multiple different videoconferencing applications with one another. In the method, a first video conferencing platform (VCP) server communicates with a connector application to participate in a video conference hosted by a connector application. A first stream is transmitted from the first VCP server to the connector application, and a second stream is transmitted from the second VCP server to the connector application. The first and second streams each includes video and audio data captured from a respective user devices.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIG. 3 is a diagram illustrating a system that provides video conferences in a virtual environment.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Embodiments disclose a system that allows users to participate in video conferences while remaining in their familiar video conference application by seamlessly integrating audio, video, and names from multiple VCP into the same video conference. Specifically, described herein is a system that integrates multiple VCP into one video conference, and in some instances integrates the one video conference into a 3D virtual environment.

Video Conference with Avatars in a Virtual Environment

Figure 1:
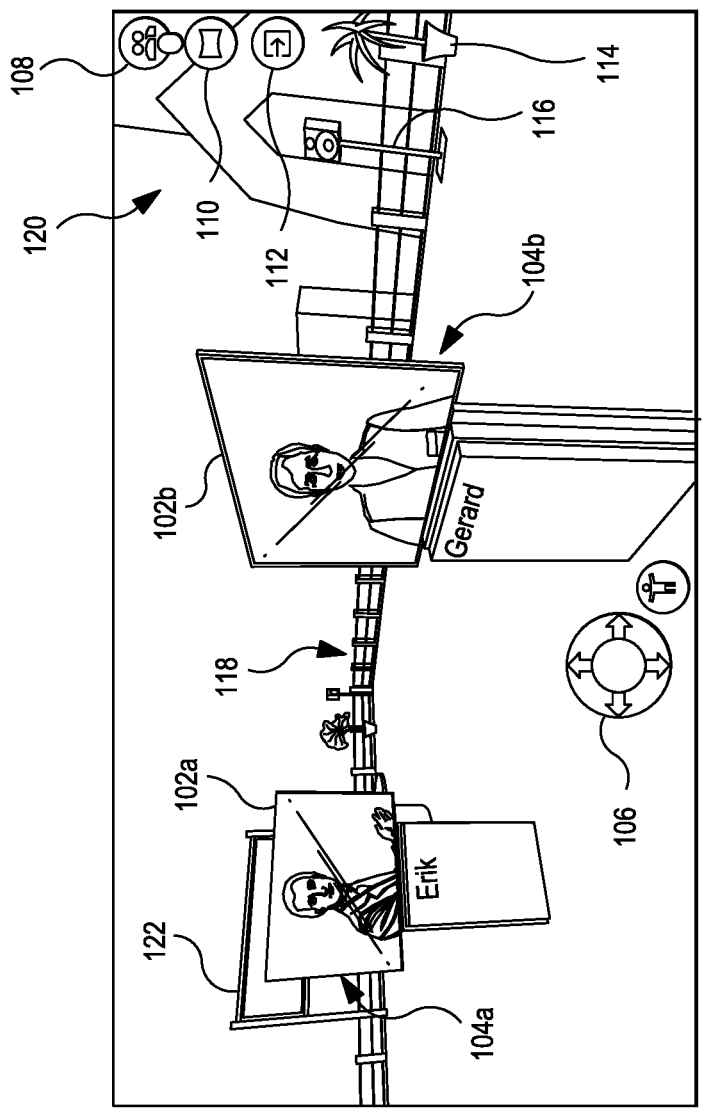
FIG. 1 is a diagram illustrating an example interface that provides video conferencing in a virtual environment with video streams being mapped onto avatars.

FIG. 1 is a diagram illustrating an example of an interface 100 that provides video conferences in a virtual environment with video streams being mapped onto avatars.

Interface 100 may be displayed to a participant to a video conference. For example, interface 100 may be rendered for display to the participant and may be constantly updated as the video conference progresses. A user may control the orientation of their virtual camera using, for example, keyboard inputs. In this way, the user can navigate around a virtual environment. In an aspect, different inputs may change the virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and B, which each represent different participants to the video conference. Avatars 102A and B, respectively, have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the video conference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as with three-dimensional model 118, these models can be represented using any mathematical way to represent a geometric surface in three-dimensional space. These models may be separate from three-dimensional model 118 or combined into a single representation of the virtual environment.

Decorative models, such as decorative model 114, serve to enhance the realism and increase the aesthetic appeal of the arena. Speaker model 116 may virtually emit sound, such as presentation and background music. Presentation screen model 122 can serve to provide an outlet to present a presentation. Video of the presenter or a presentation screen share may be texture mapped onto presentation screen model 122. As will be discussed in greater detail below, presentation screen model 122 may include video or screen share data from VCP participants.

Button 108 may provide the user with a list of participants. In one example, after a user selects button 108, the user can chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of their surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump, or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, aspects provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective when a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, and special ops), and making reservations (e.g., for a certain holiday, home/car/etc.)

Figure 2:
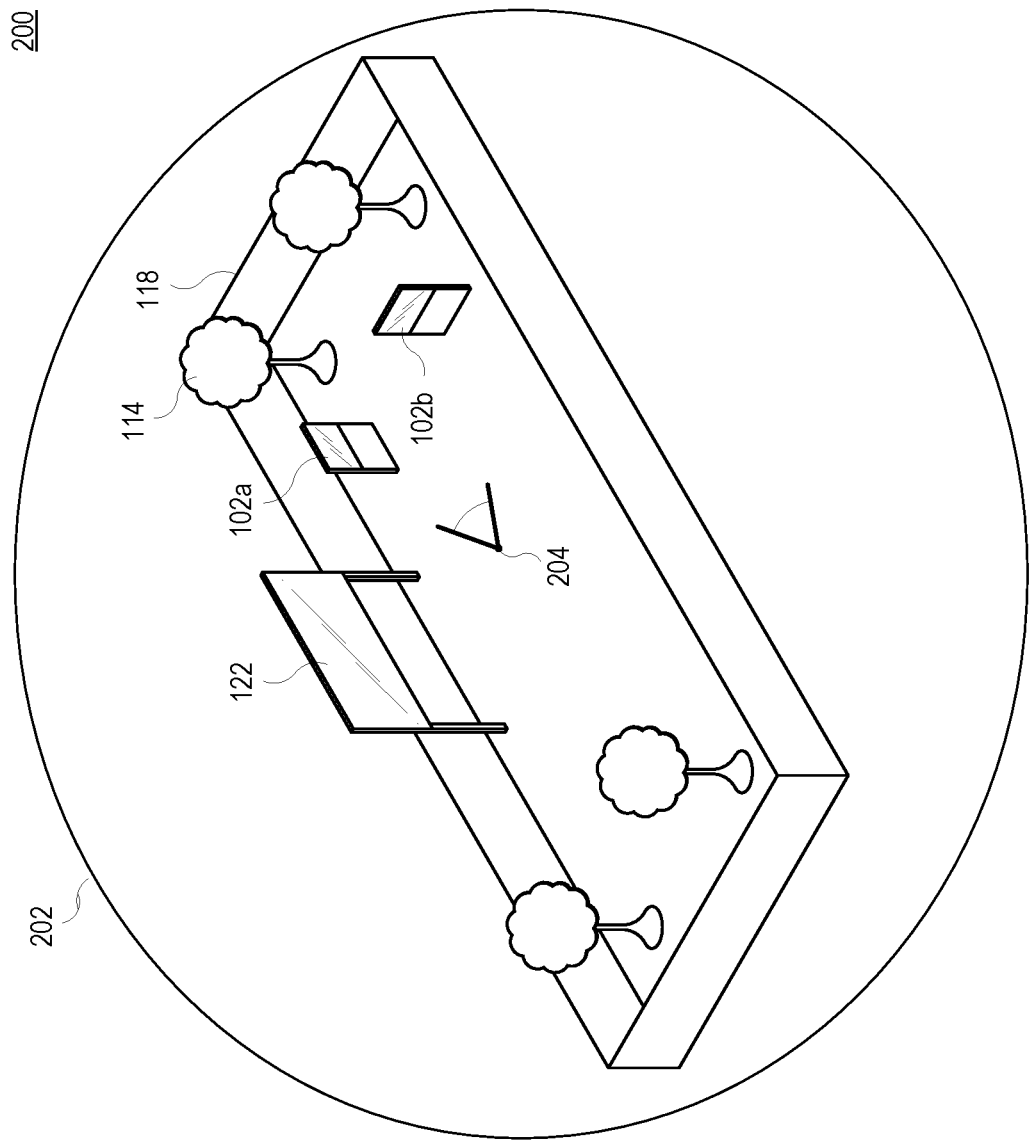
FIG. 2 is a diagram illustrating a three-dimensional model used to render a virtual environment with avatars for video conferencing.

FIG. 2 is a diagram 200 illustrating a three-dimensional model used to render a virtual environment with avatars for video conferencing. Just as illustrated in FIG. 1, the virtual environment here includes a three-dimensional model 118, and various three-dimensional models, including decorative model 114 and presentation screen model 122. Also as illustrated in FIG. 1, diagram 200 includes avatars 102A and B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of sphere 202 may be used to texture map the background image. In various alternative aspects, the shape may be a cylinder, cube, rectangular prism, or any other three-dimensional geometric shape.

FIG. 3 is a diagram illustrating a system 300 that provides video conferences in a virtual environment. System 300 includes a server 302 coupled to devices 306A and B via one or more networks 304.

Server 302 provides the services to connect a video conference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative aspect, communication between devices 306A-B happens not through server 302 but on a peer-to-peer basis. In that aspect, one or more of the data describing the respective participants' location and direction, the notifications regarding new and existing participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, a tablet computer, or a wearable computer (such as a smartwatch or an augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser 308A-B retrieves the necessary content from a web server, interprets and executes the content, and then displays the page on a display on devices 306A-B shown as client/counterpart conference application 310A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browser 308A-B. In an aspect, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of devices 306A-B. Moreover, OpenGL rendering of interactive two-dimensional and three-dimensional graphics without the use of plug-ins is also possible.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three-dimensional modeling data, including data describing the three-dimensional environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Conference application 310A-B may be configured to connect to one or more additional servers, specifically video conferencing platform (VCP) servers, to allow a user to schedule and join a video conference on a separate VCP while in the virtual space. Conference application 310A-B may be configured to stream the webcam video stream and microphone audio stream of the user to a VCP server and receive an audio/video stream of users participating in the video conference that are not participating in the virtual space. In some aspects, conference application 310A-B may render the audio/video stream from the video conference in the virtual space.

According to an embodiment, a user in the virtual space may connect the virtual space to the user's account on an alternative VCP. The connection would permit direct communication between users on the alternative VCP and the user within the virtual space. For example, the direct communication may allow the user to answer a call from an alternative VCP user within the virtual space.

Figure 4A:
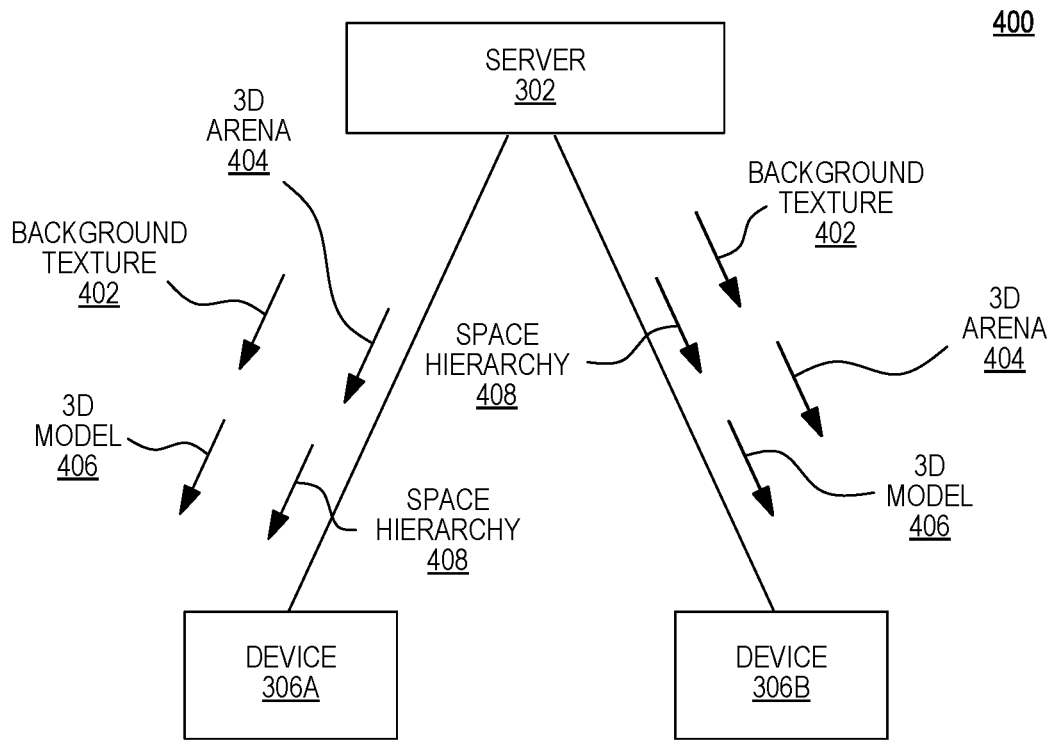
FIGS. 4A-4C illustrate how data is transferred between various components of the system in FIG. 3 to provide video conferencing.
Figure 4B:
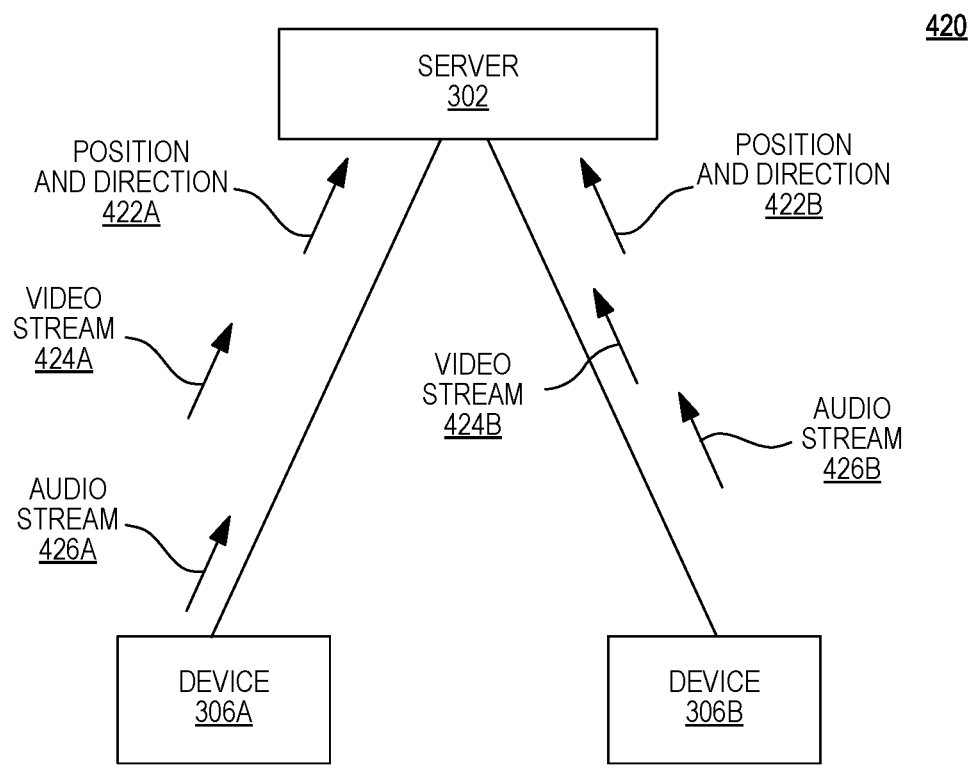
Figure 4C:
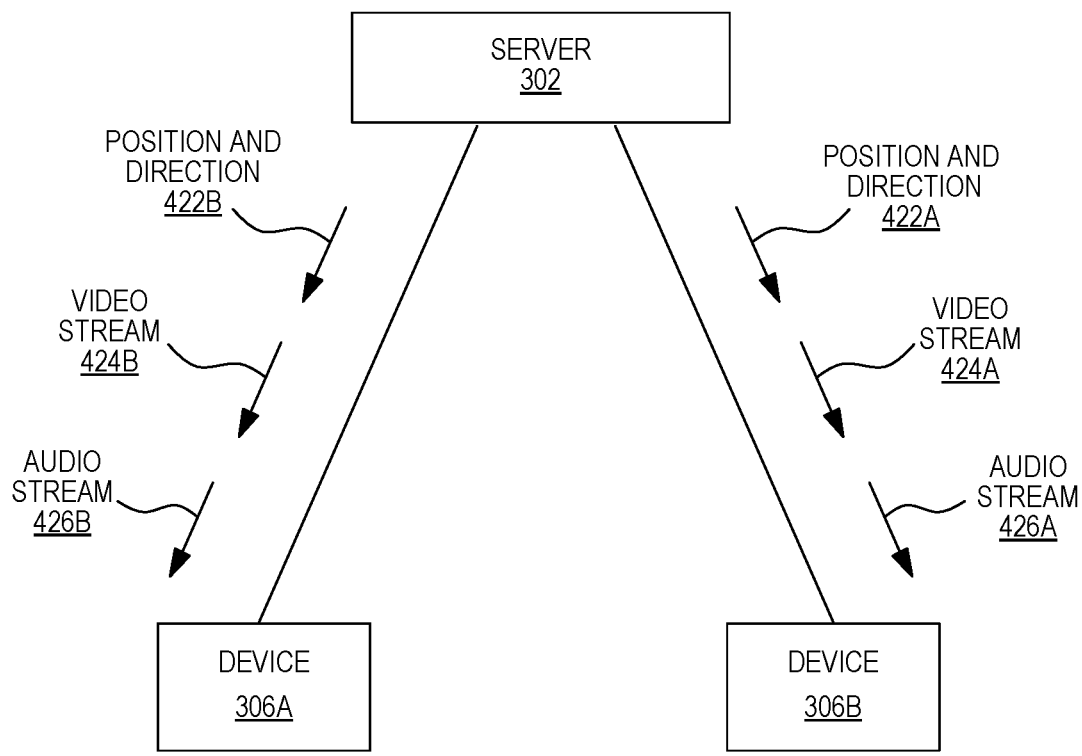

FIGS. 4A-C illustrate how data is transferred between various components of the system in FIG. 3 to provide video conferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and B. In particular, both devices 306A and B receive from server 302 the three-dimensional arena 404, background texture 402, space hierarchy 408, and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Any other three-dimensional modeling information 406 is any other three-dimensional modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and B, and FIG. 4C illustrates a diagram 460 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user of devices 306A and B. As described above, the position may be a coordinate in three-dimensional space (e.g., x, y, z coordinate) and the direction may be a direction in three-dimensional space (e.g., pan, tilt, roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422A-B each may include at least a coordinate on a horizontal plane in the three-dimensional virtual space and a pan and tilt value. Alternatively or additionally, the user may be able to "jump" its avatar, so the Z position may be specified only by an indication of whether the user is jumping their avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or Vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference application 310A-B, and conference application 310A-B may be implemented in JavaScript. Conference application 310A-B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference application 310A-B may periodically or intermittently re-render the virtual space based on new information from respective video streams 424A and B, position and direction 422A and B, and new information relating to the three-dimensional environment. For simplicity, each of these updates are now described from the perspective of device 306A. However, a skilled artisan would understand that device 306B would behave similarly given similar changes.

As device 306A receives video stream 424B, device 306A texture maps frames from video stream 424B on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some aspects, server 302 may send updated model information describing the three-dimensional virtual environment. For example, server 302 may send updated information describing background texture 402, three-dimensional arena 404, any other three-dimensional modeling information 406, or space hierarchy 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-4C is illustrated with two devices for simplicity, a skilled artisan would understand that the techniques described herein can be extended to any number of devices. Also, while FIG. 3 in FIGS. 4A-4C illustrates a single server 302, a skilled artisan would understand that the functionality of server 302 can be spread out among a plurality of computing devices. In an aspect, the data transferred in FIG. 4A may come from one network address for server 302, while the data transferred in FIGS. 4B-4C can be transferred to/from another network address for server 302.

In one aspect, participants can set their webcam, microphone, speakers and graphical settings before entering the virtual conference. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around, and interacting. When they are ready, the user automatically leaves the virtual waiting room and joins the real virtual environment.

Integrating Multiple Video Conference Platforms into a Video Conference Session

Figure 5A:
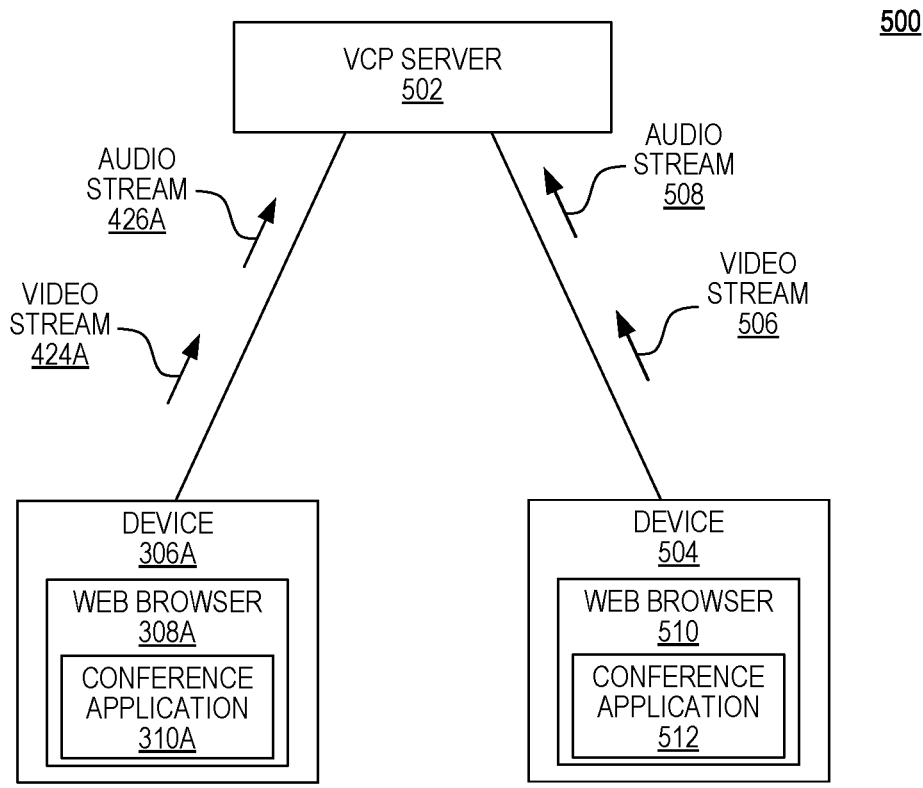
FIGS. 5A-5C are diagrams illustrating how data is transferred between various components of a system to integrate video conferencing between a 3D virtual environment and a video conference.
Figure 5B:
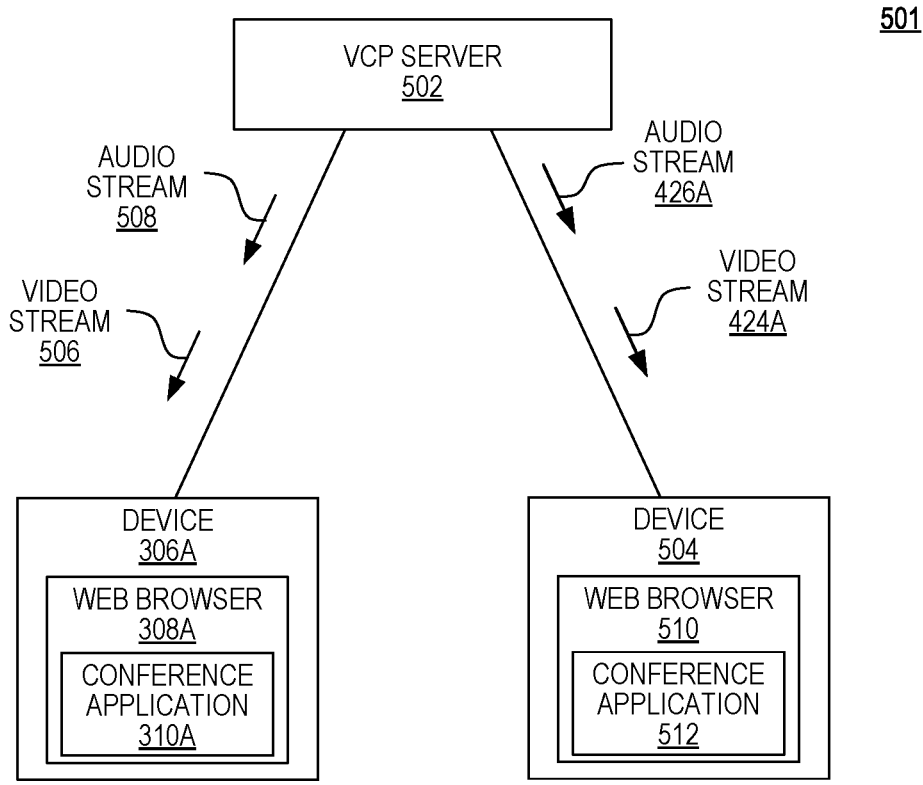
Figure 5C:
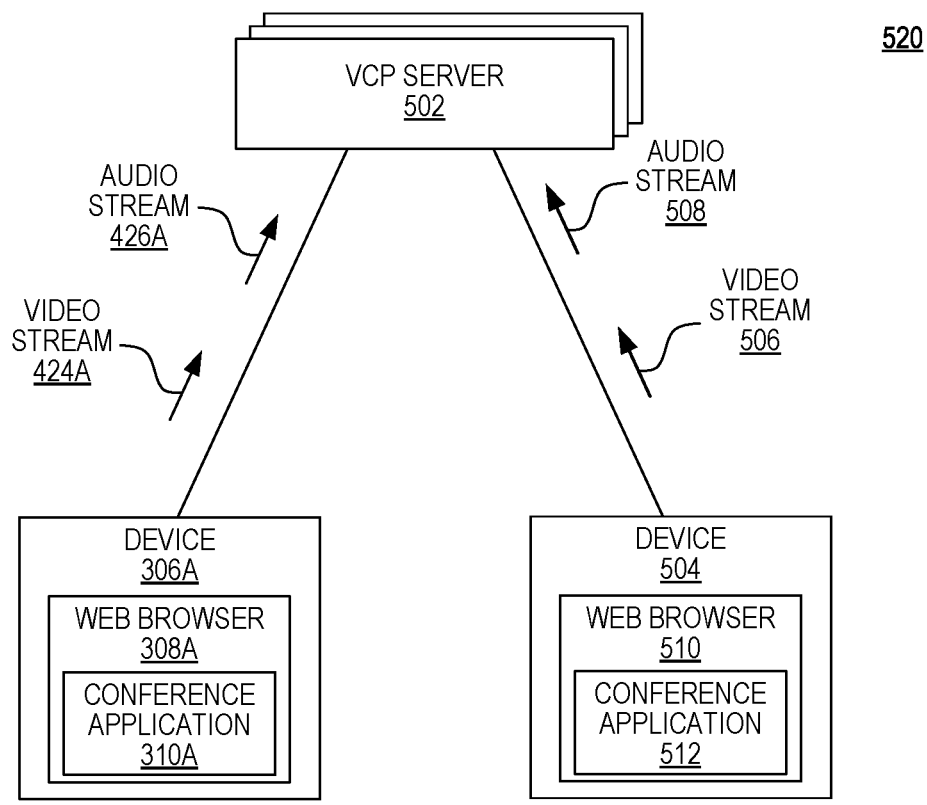

In a video conference system, a VCP may provide a conference application that connects to the VCP's server to host video conferences within the conference application. In one aspect, when integrating multiple VCPs for a video conference, a conference application may connect to both a server that hosts a three dimensional virtual environment and a server of a VCP to join the video conference hosted by the VCP, as shown in FIGS. 5A-C. In another aspect, multiple each VCP's may stream video directly to a client application, without the need for a three-dimensional virtual environment, as described in FIGS. 6A-B.

FIGS. 5A-C illustrate how data is transferred between various components of a system to integrate video conferencing between a 3D virtual environment and a video conference. Each of FIGS. 5A-C depict the connection between VCP server 502 and devices 306A and 504. In particular, FIGS. 5A-C illustrate example data flows between those devices.

VCP server 502 provides the services to connect a video conference session between devices 306A and 504. As will be described in greater detail below, VCP server 502 communicates notifications to devices of conference participants (e.g., devices 306A and 504) when new participants join the conference and when existing participants leave the conference. VCP server 502 also communicates video and audio streams between the respective devices of the participants (e.g., devices 306A and 504).

VCP server 502 may be any server that is configured to host a video conference session. For example, VCP server 502 may be a server that hosts video conference meetings held through the Microsoft Teams service available from Microsoft Corporation of Redmond, WA, ZOOM service available from Zoom Communications Inc. of San Jose, CA, or WebEx service available from Cisco Systems of San Jose, CA. In some aspects, VCP server 502 may be server 302.

VCP server 502 responds to requests with a response. VCP server 502 may be a web server. A web server is software and hardware that uses HTTP (Hypertext Transfer Protocol) and other protocols to respond to client requests made over the World Wide Web. The main job of a web server is to display website content through storing, processing and delivering webpages to users.

A network, for example network 304, enables communication between the various devices 306A and 504 and VCP server 502.

Devices 306A and 504 are each devices of respective participants to a video conference. Device 306A is previously described in FIG. 3. As will be described in greater detail below, device 504 includes a display to present the rendered conference information, a speaker (such as a headset) to provide audio to the user for the video conference, a microphone to capture a user's voice input, and a camera positioned to capture video of the user's face.

Device 504 can be any type of computing device, including a laptop, a desktop, a smartphone, a tablet computer, or a wearable computer (such as a smartwatch or a augmented reality or virtual reality headset).

Web browser 308A is previously described in FIG. 3. Web browser 510 can retrieve a network resource (such as a webpage) addressed by the link identifier (such as a uniform resource locator, or URL) and present the network resource for display. In particular, web browser 510 is a software application for accessing information on the World Wide Web. Usually, web browser 510 makes this request using the hypertext transfer protocol (HTTP or HTTPS). When a user requests a web page from a particular website, the web browser retrieves the necessary content from a web server, interprets and executes the content, and then displays the page on a display on device 504 shown as client/counterpart conference application 512. In examples, the content may have HTML, and client-side scripting, such as JavaScript. Once displayed, a user can input information and make selections on the page, which can cause web browser 510 to make further requests.

Conference application 310A is previously described in FIG. 3. Conference application 512 may be a web application downloaded from VCP server 502 and configured to be executed by the respective web browser 510. In an aspect, conference application 512 may be a JavaScript application. In one example, conference application 512 may be written in a higher-level language, such as a Typescript language, and translated or compiled into JavaScript. Conference application 512 is configured to interact with the WebGL JavaScript application programming interface. It may have control code specified in JavaScript and shader code written in OpenGL ES Shading Language (GLSL ES). Using the WebGL API, conference application 512 may be able to utilize a graphics processing unit (not shown) of device 504. Moreover, OpenGL rendering of interactive two-dimensional and three-dimensional graphics without the use of plug-ins is also possible.

Conference application 512 receives video and audio streams of other conference participants from VCP server 502. In some aspects, conference application 512 receives names of each conference participant.

Additionally, conference application 512 renders a video conference interface. In some aspects, the video conference interface renders the video data from each conference participant in a two-dimensional grid such that each users' video data is displayed in a particular area of the two-dimensional grid.

FIG. 5A illustrates a diagram 500 showing how VCP server 502 receives information from respective devices 306A and 504, and FIG. 5B illustrates a diagram 501 showing how VCP server 502 transmits the information to respective devices 504 and 306A. In particular, device 306A transmits video stream 424A and audio stream 426A to VCP server 502, which transmits video stream 424A and audio stream 426A to device 504. And, device 504 transmits video stream 506 and audio stream 508 to VCP server 502, which transmits video stream 506 and audio stream 508 to device 306A.

FIG. 5C illustrates a diagram 520, which illustrates that multiple VCP servers 502 may receive and transmit information from respective devices 306A and 504. Although FIG. 5C illustrates the multiple VCP servers 502 receiving video streams 424A and 506 and audio streams 426A and 508, the multiple VCP servers 502 may transmit video streams 424A and 506 and audio streams 426A and 508 as illustrated in FIG. 5B.

Figure 6A:
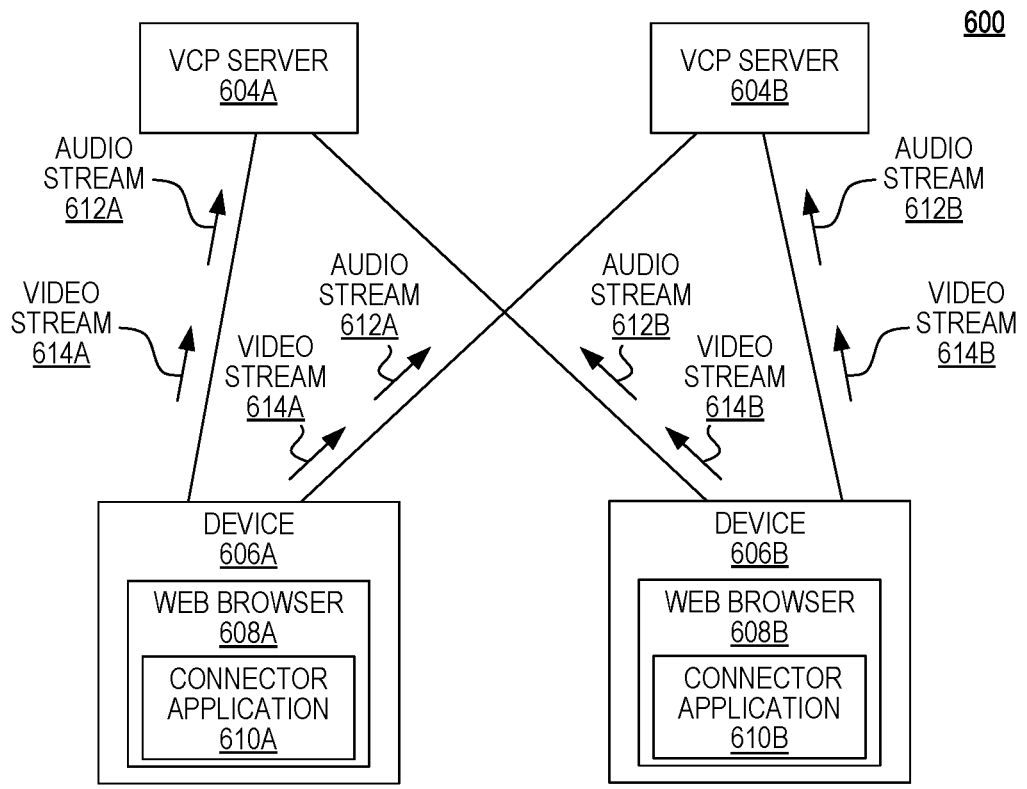
FIGS. 6A-6B are diagrams illustrating how data is transferred between various components of a system to integrate video conferencing between multiple video conferencing platforms.
Figure 6B:
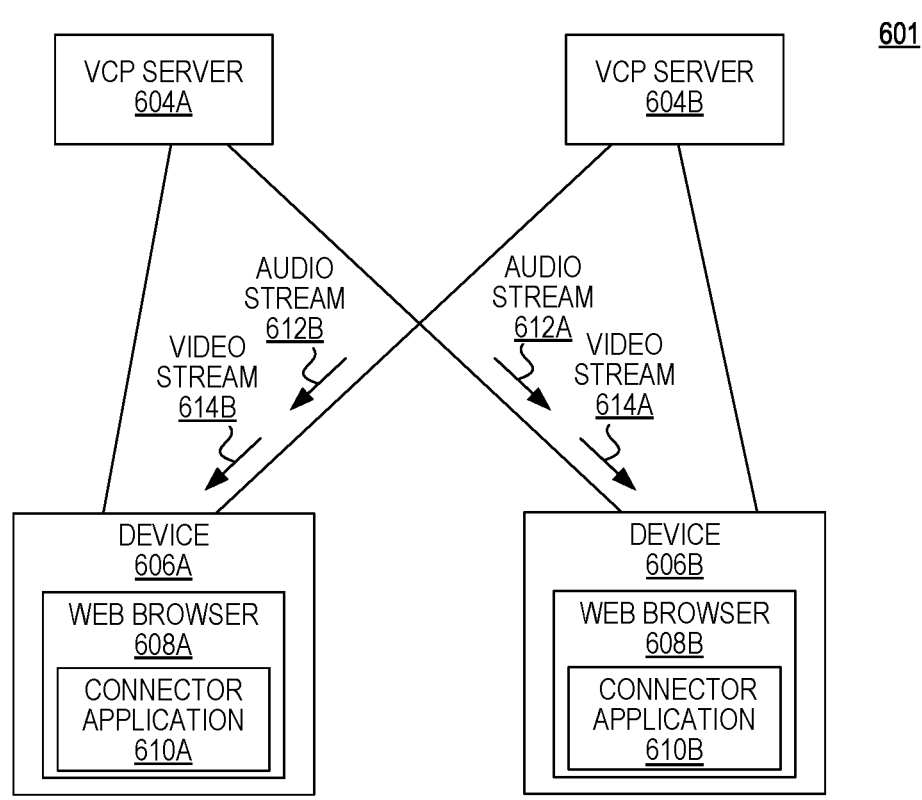

FIGS. 6A-B illustrate how data is transferred between various components of a system to integrate video conferencing between multiple video conferencing platforms. Each of FIGS. 6A-B depict the connection between VCP servers 604A-B and devices 606A-B. In particular, FIGS. 6A-B illustrate example data flows between those devices.

VCP servers 604A-B may be any server that is configured to host video conferences. In some aspects, VCP servers 604A-B are each a VCP server 502. In some aspects, VCP server 604A is server 302 and VCP server 604B is VCP server 502. In some aspects, VCP servers 604A-B are each a server 302.

A network, for example network 304, enables communication between VCP servers 604A-B and their respective devices 606A-B.

Devices 606A-B are each devices of respective participants to a video conference. In some aspects, devices 606A-B are devices 306A-B. In some aspects, device 606A is device 306A and device 606B is device 504. In some aspects, devices 606A-B are each a device 504.

Web browser 608A-B can retrieve a network resource (such as a webpage) addressed by the link identifier (such as a uniform resource locator, or URL) and present the network resource for display. In particular, web browser 608A-B is a software application for accessing information on the World Wide Web. Usually, web browser 608A-B makes this request using the hypertext transfer protocol (HTTP or HTTPS). When a user requests a web page from a particular website, the web browser retrieves the necessary content from a web server, interprets and executes the content, and then displays the page on a display on device 606A-B shown as client/counterpart connector application 608A-B. In examples, the content may have HTML and client-side scripting, such as JavaScript. Once displayed, a user can input information and make selections on the page, which can cause web browser 608A-B to make further requests.

Connector application 610A-B may be a web application downloaded from VCP server 604A, VCP server 604B, or another server that stores connector application 610A-B and is configured to be executed by the respective web browser 606A or 606B. In an aspect, connector application 610A-B may be a JavaScript application. In one example, connector application 610A-B may be written in a higher-level language, such as a Typescript language, and translated or compiled into JavaScript. Connector application 610A-B is configured to interact with the WebGL JavaScript application programming interface. It may have control code specified in JavaScript and shader code written in OpenGL ES Shading Language (GLSL ES). Using the WebGL API, connector application 610A-B may be able to utilize a graphics processing unit (not shown) of device 606A-B. Moreover, OpenGL rendering of interactive two-dimensional and three-dimensional graphics without the use of plug-ins is also possible.

In some aspects, connector application 610A-B may be an application configured as a hub for connecting a plurality of devices to a plurality of VCP servers. Connector application 610A-B provides the services to connect a video conference session between devices 606A and 606B by connecting device 606A-B to both VCP servers 604A-B. In some aspects, connector application 610A-B may be conference application 310A-B. In some aspects, connector application 610A-B may be conference application 512. In some aspects, connector application 610A may be conference application 310A and connector application 610B may be conference application 512.

FIG. 6A illustrates a diagram 600 showing how VCP servers 604A-B receive information from devices 606A-B. In particular, device 606A transmits video stream 614A and audio stream 612A to VCP server 604A and VCP server 604B. And device 606B transmits video stream 614B and audio stream 612B to VCP server 604B and VCP server 604A.

FIG. 6B illustrates a diagram 601 showing how VCP servers 604A-B transmit information to devices 606A-B. In particular, VCP server 604A transmits video stream 614A and audio stream 612A to device 606B and VCP server 604B transmits video stream 614B and audio stream 612B to device 606A. When a plurality of users are connected to a video conference session through the same conference application, the plurality of users receive a video and audio stream from the conference application's respective VCP server. For example, if device 606A and a second device are both connected to a video conference using conference application 512, device 606A will receive a video and audio stream from the second device through VCP server 604A.

In a further embodiment, instead of video and audio data being transmitted from each client to two different VCP servers, a client would only connect to one, which has the ability to interface directly with other VCP servers on other VCP platforms. In that embodiment, video and audio data would stream from device 606A to VCP server 604A. VCP server 604A would stream data to VCP server 604B. Finally, VCP server 604B would stream the data to device 606B. Optionally, the same would work in the reverse direction to stream data from device 606B to device 606A, or device 606B could stream directly to server 604A, which would rebroadcast to device 606A.

FIGS. 7A-D are diagrams illustrating an example interface when video conferencing is integrated into a video conference. More specifically, In the interfaces in FIGS. 7A-D, users 704, 706, 708, 710, 712, and 714 are participating in a video conference. Users 704, 708, 712, and 714 are conference participants connecting to the video conference on a VCP conference application (e.g., conference application 512). Users 706 and 710 are conference participants connecting to the video conference while connected to a conference application rendering a 3D virtual environment (e.g., conference application 310A-B). Each interface is described below.

Figure 7A:
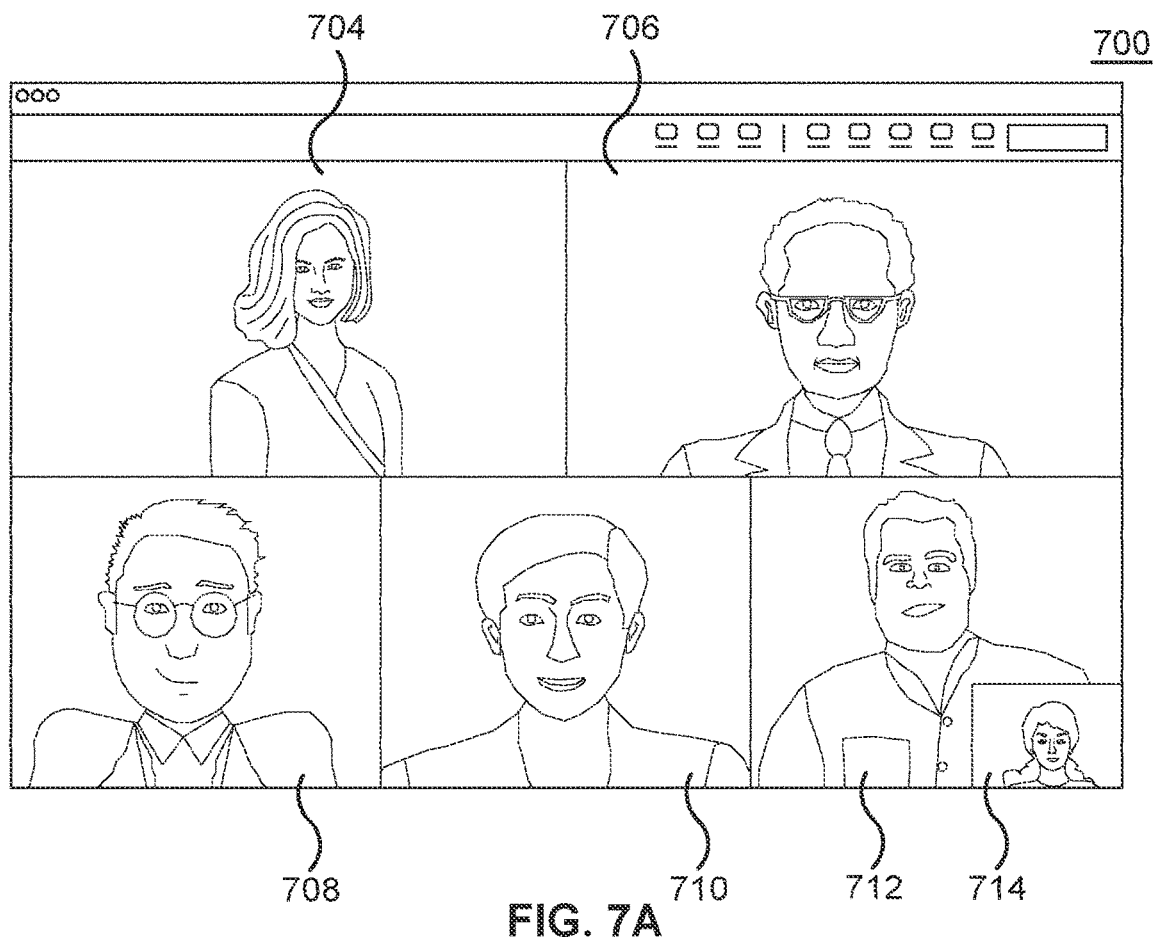
FIG. 7A-D are diagrams illustrating an example interface when video conferencing is integrated into a three dimensional virtual environment.

FIG. 7A illustrates an example interface 701 from the perspective of user 714 in the VCP conference application during a video conference. As shown in FIG. 7A, the VCP conference application partitions the screen into rectangular areas, and in each rectangular area, a video stream of another user is presented. In particular, users 704, 706, 708, 710, 712 each have their own video stream presented in a different rectangular area. Each user's video stream is captured from a camera mounted on each respective user's device. The respective cameras are mounted to capture the respective user's heads. The VCP conference application renders each video stream two dimensionally within its designated two-dimensional area. VCP conference application also shows video of its own user 714 so that user 714 has awareness that her video is on and being streamed to other users.

As mentioned above, some of the users—users 704, 708, 712—are participating in the conference through their own VCP conference applications, while other of the users—users 706 and 710—are participating in the conference from a 3D virtual environment. Thus, video for users 704, 708, 712 may be received from a VCP server, while video for users 706 and 710 may be received from a server hosting the three-dimensional virtual environment, either directly or from the VCP server as an intermediary.

Figure 7B:
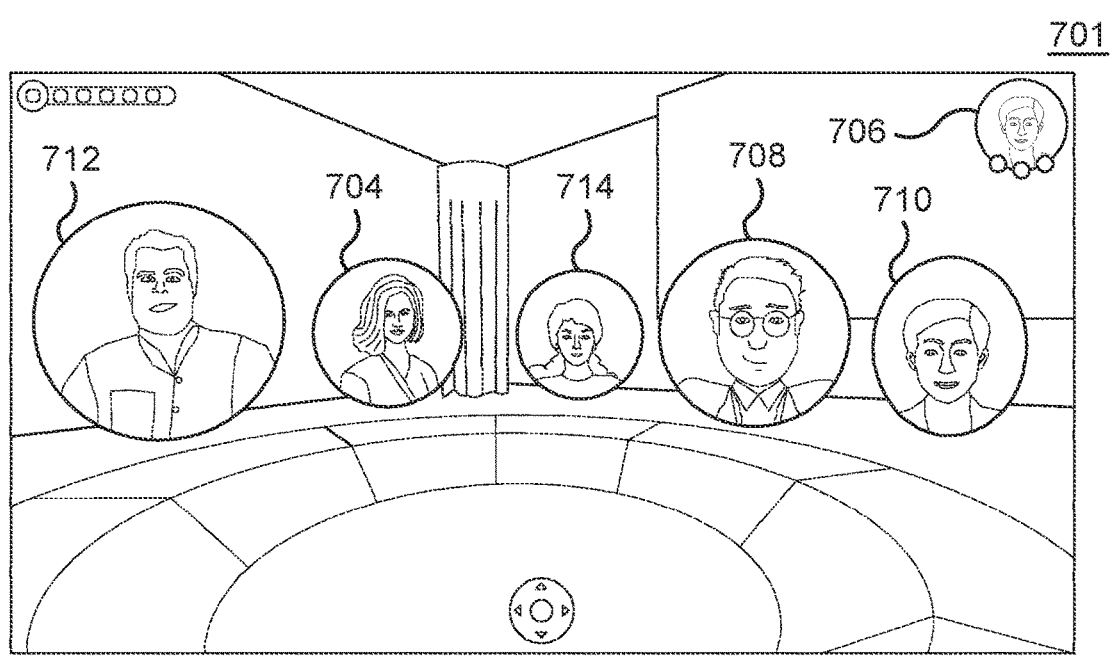

FIG. 7B illustrates an example interface 701 from the perspective of user 706 in the 3D virtual environment during a video conference. Example interface 701 shows video for all the other users participating in the conference—users 704, 708, 710, 712, and 714. Each video stream is texture mapped to an avatar. For those users participating in the conference through their own their own VCP conference applications—users 704, 708, 712, and 714—the avatar may be at a fixed position. The position may be fixed in that the users 704, 708, 712, and 714 are unable to control the position and orientation of their respective avatars. This is because they are participating in the conference in an application that lacks a notion of the three dimensional virtual space illustrated in interface 701.

Instead of users 704, 708, 712, and 714 controlling their respective avatars, the application rendering the three-dimensional virtual environment instead determines a position and location of the respective avatars. The application may position them logically around a conference table or within user 706's field of view as described below with respect to situator 1114 and virtual situator 1120

As mentioned above, user 710 is participating in the conference from a 3D virtual environment. Thus, user 710 may control its corresponding avatar as user 710 navigates its virtual camera through the three dimensional virtual environment, as described in greater detail above.

Figure 7C:
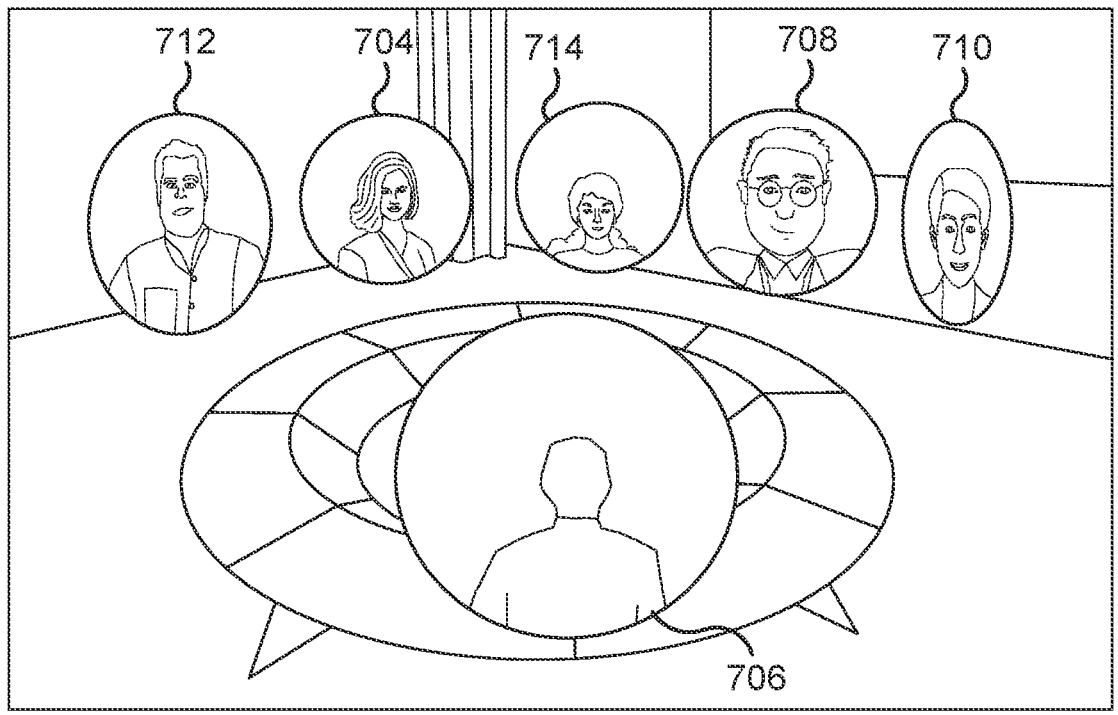

FIG. 7C illustrates an example interface 702 from a third-person perspective over user 706's shoulder in the 3D virtual environment during a video conference. In this example, interface 701 is rendered from a perspective of a virtual camera positioned above and behind an avatar for user 706. As user 706 navigates its avatar through the virtual environment, the virtual camera follows to allow user 706 to have a sense of its own character in the three dimensional virtual world.

Figure 7D:
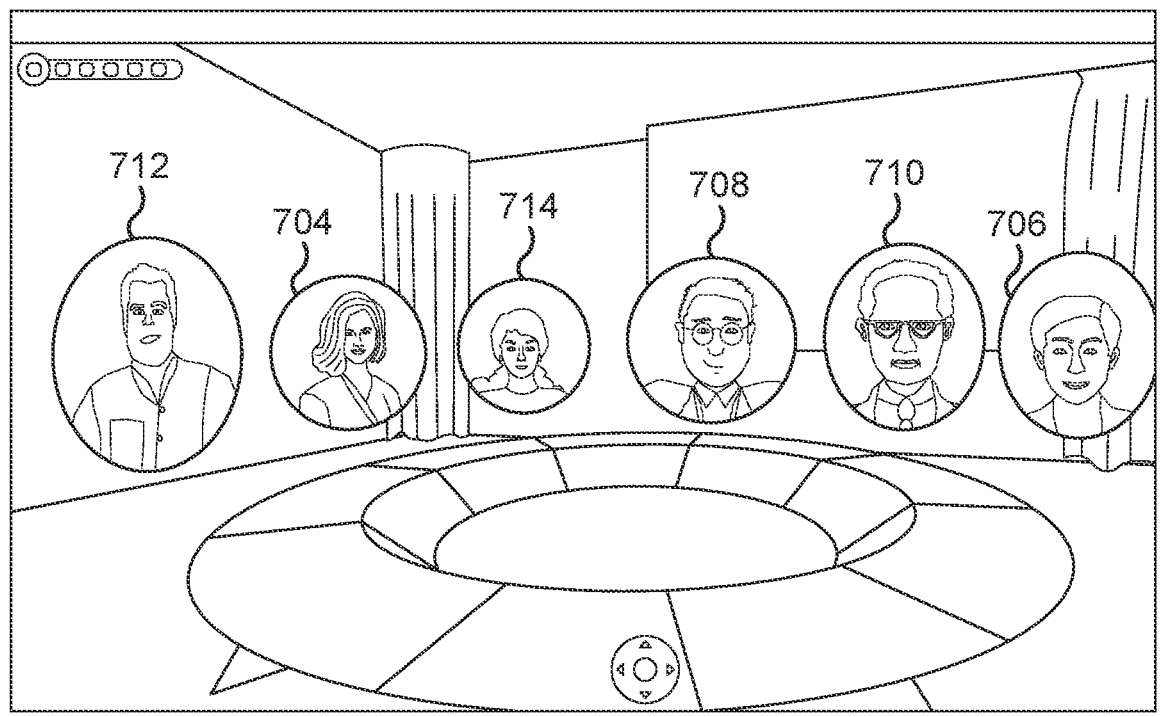

FIG. 7D illustrates an example interface 703 from a third-person perspective in the 3D virtual environment during a video conference. Example interface 703 may be rendered from a perspective of a virtual camera at a fixed position in the 3D virtual environment. For example, the virtual camera may be positioned at model of a virtual presentation screen in a conference room. Thus, interface 703 allows a user to peer into the 3D virtual environment.

Figure 8A:
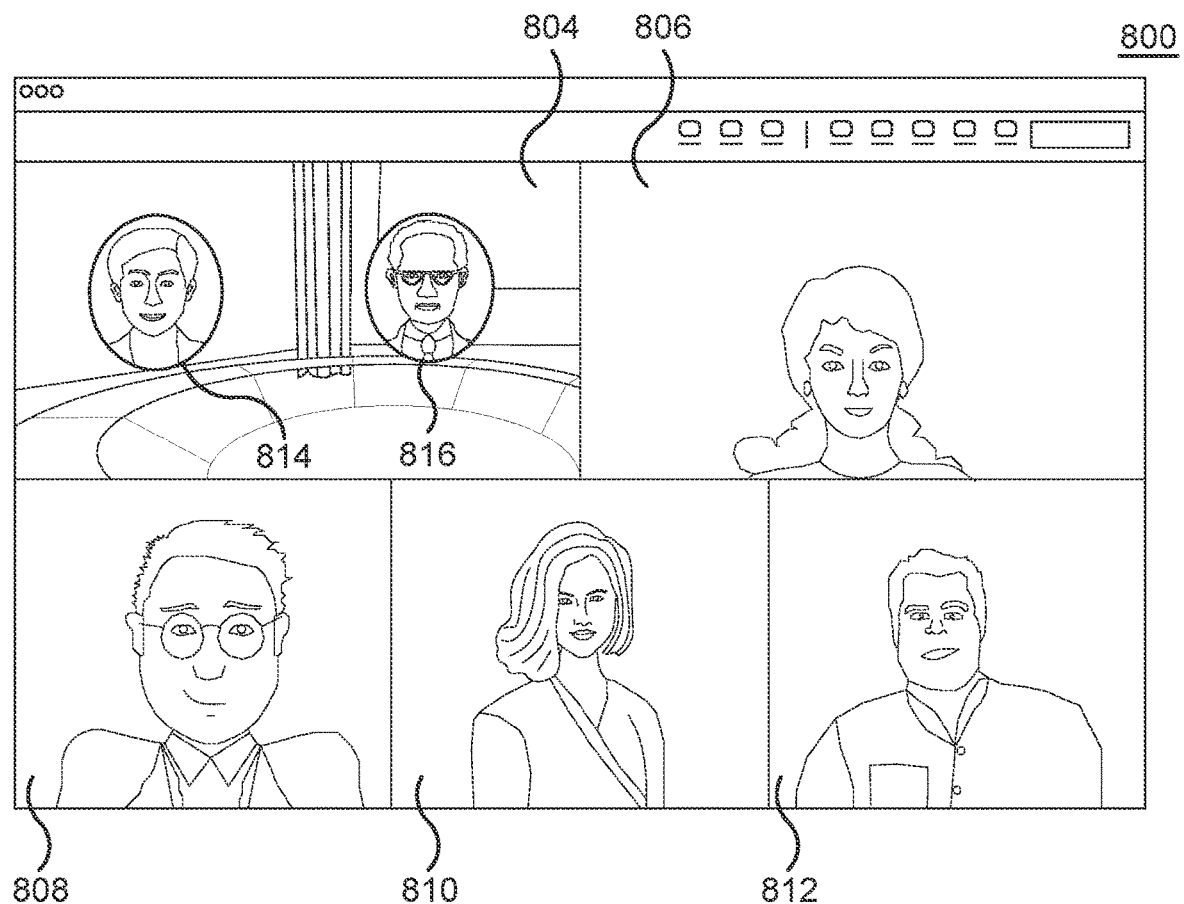
FIGS. 8A-8C are diagrams illustrating an example interface when video conferencing is integrated into a three dimensional virtual environment.
Figure 8B:
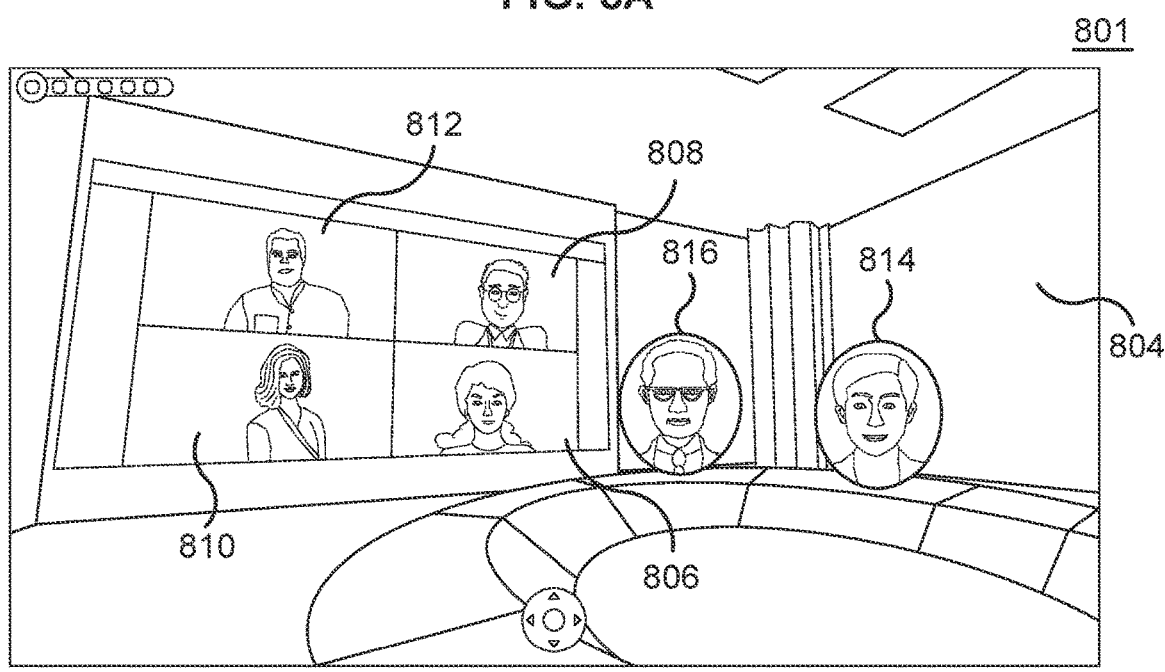
Figure 8C:
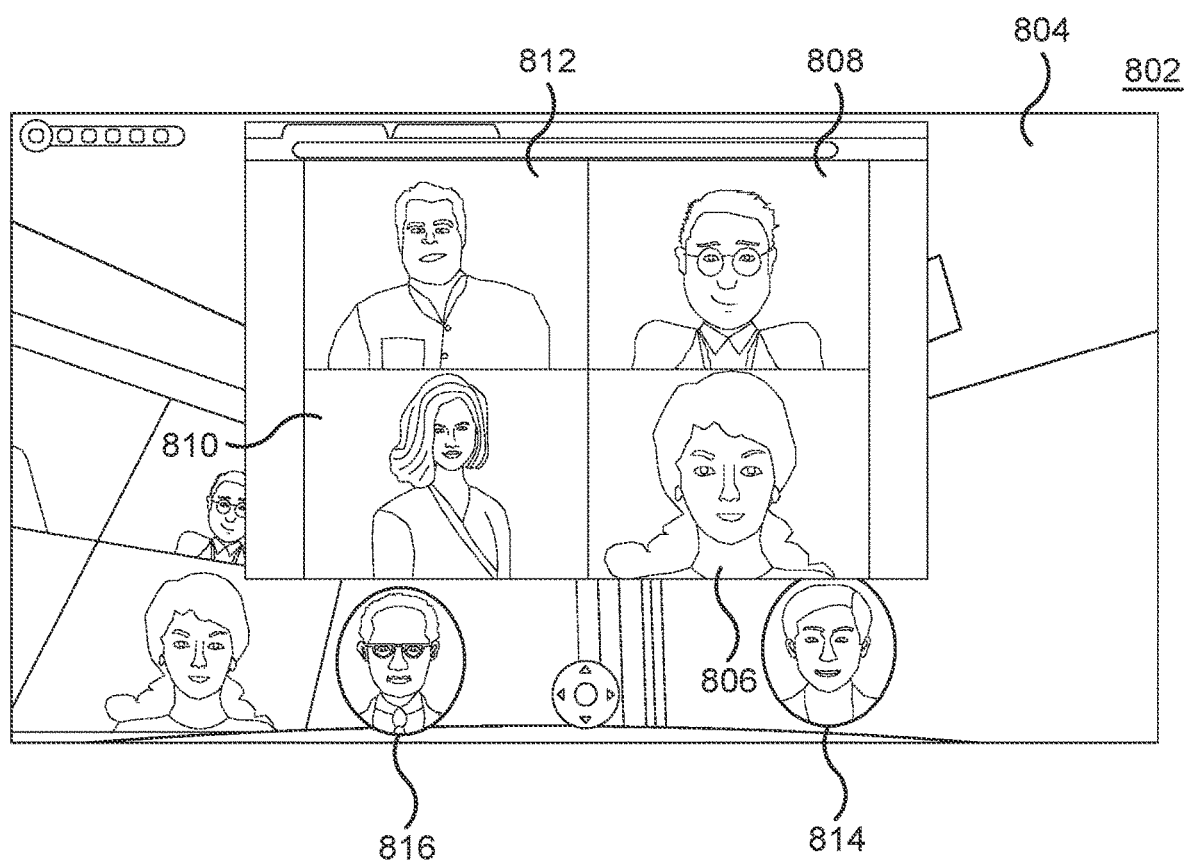

FIGS. 8A-C are diagrams illustrating an example interface when video conferencing in an integrated video conference. In particular, FIGS. 8A-C illustrate a hybrid experience in an integrated video conference that includes devices connecting from a VCP and devices connecting from a 3D virtual environment, as will be described in greater detail below.

FIGS. 8A-C include 3D virtual environment 804 and video data from users 806, 808, 810, 812, 814, and 816. In some aspects, 3D virtual environment 804 is the virtual environment described in FIGS. 1-3. Users 806, 808, 810, and 812 are conference participants connecting to the video conference on a VCP conference application (e.g., conference application 512). Users 814 and 816 are conference participants connecting to the video conference while connected to a conference application rendering a 3D virtual environment (e.g., conference application 310A-B).

FIG. 8A illustrates an example interface 800 of a video conference in the VCP conference application during a video conference. A VCP conference application of a conference participant may render interface 800. As described above, the VCP conference application partitions the screen space into separate areas for each of video streams it receives. Users 806, 808, 810, and 812 are connecting through there own VCP conference applications. Similar to what was described above for FIG. 7A, each of users 806, 808, 810, and 812 have video streams are transmitted through a VCP server to the VCP application and the VCP application renders the video two dimensionally in its separate partitioned area.

In addition, interface 800 includes a perspective of the 3D virtual environment 804. The perspective may be a perspective of a virtual camera positioned in the 3D virtual environment to capture those conference participants 814 and 816 connecting to the video conference while connected to a conference application rendering a 3D virtual environment (e.g., conference application 310A-B). The virtual camera may be at a fixed location, such as at a model of a presentation screen in a virtual conference room. Alternatively the virtual camera may be dynamic. Its field of view may adjust to include new conference participants and to exclude participants leaving the meeting.

In an embodiment, a conference application 310A-B may render the virtual environment from the perspective of the virtual camera to generate a video stream of the 3D virtual environment 804. Then conference application 310A-B transmits the rendered video stream to a VCP server, which transmits it to a VCP application for presentation as illustrated in interface 800. To avoid duplicate work, there may be a negotiation process between the various conference applications 310A-B of the conference participants 814 and 816 to determine which conference applications 310A-B does the rendering and transmission of the video stream of the 3D virtual environment 804.

FIG. 8B illustrates an example interface 801 from a perspective in the 3D virtual environment during a video conference. Example interface 801 may be rendered from a perspective of a virtual camera of a conference participant. As illustrated in interface 801, 3D virtual environment includes a model of a presentation screen. On the presentation screen, conference application 310 renders video from those participants joining using a VCP server. In particular, as shown in interface 801, conference application 301 partitions the presentation screen into separate areas, one for each of the videos corresponding to users 806, 808, 810, and 812. On each area of the presentation screen model, the conference application texture maps the respective video stream for the respective user. In this way, the various videos of participants from a VCP server are rendered onto FIG. 8C illustrates an example interface 802 from a in the 3D virtual environment during a video conference. As will be described below, interface 802 may appear when the user selects the presentation screen. When the user selects the presentation screen, the videos mapped onto the screen may be overlaid onto the three dimensional model.

Figure 9:
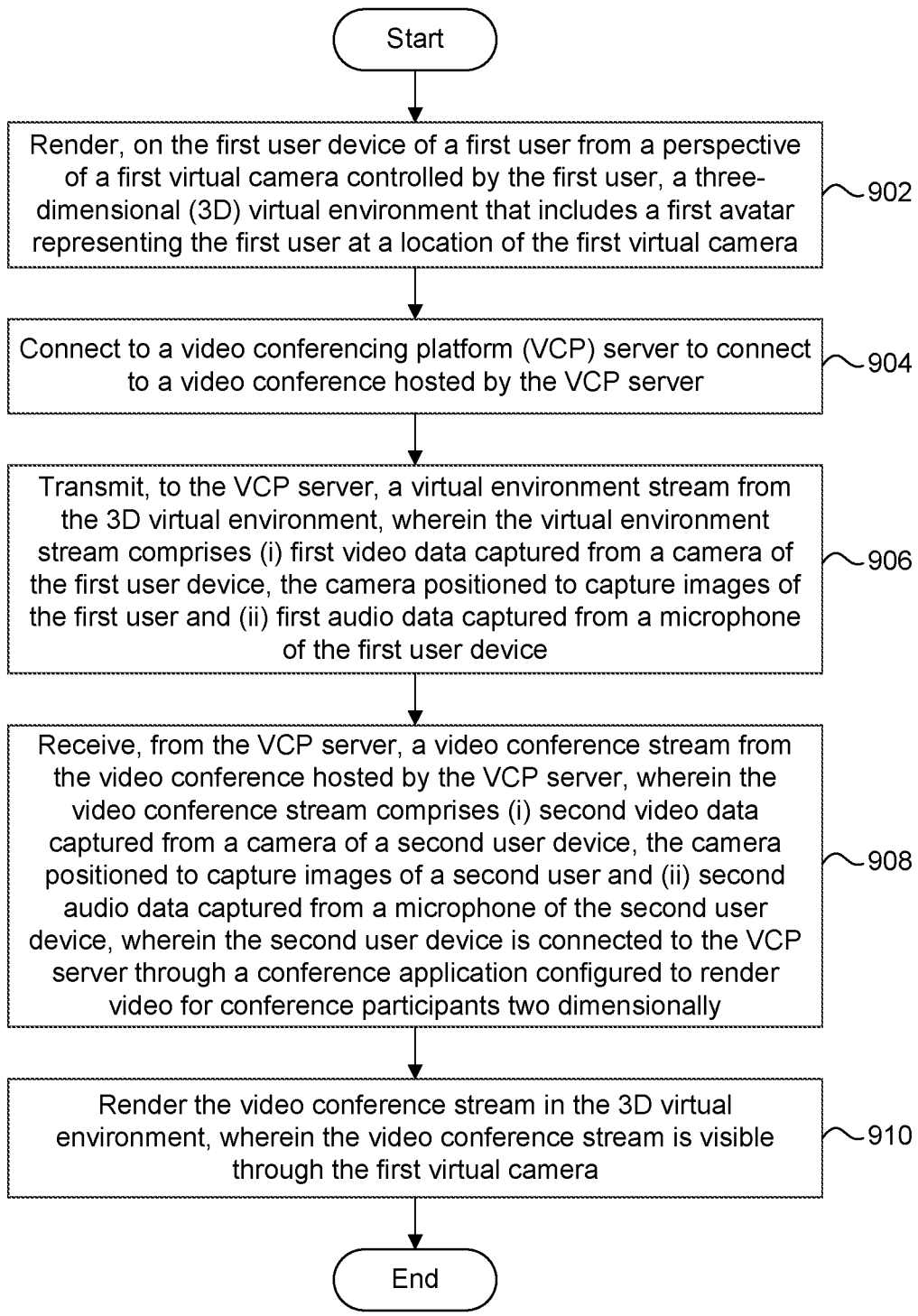
FIG. 9 is a flowchart illustrating a method for integrating video conferences and 3D virtual environments.
Figure 10:
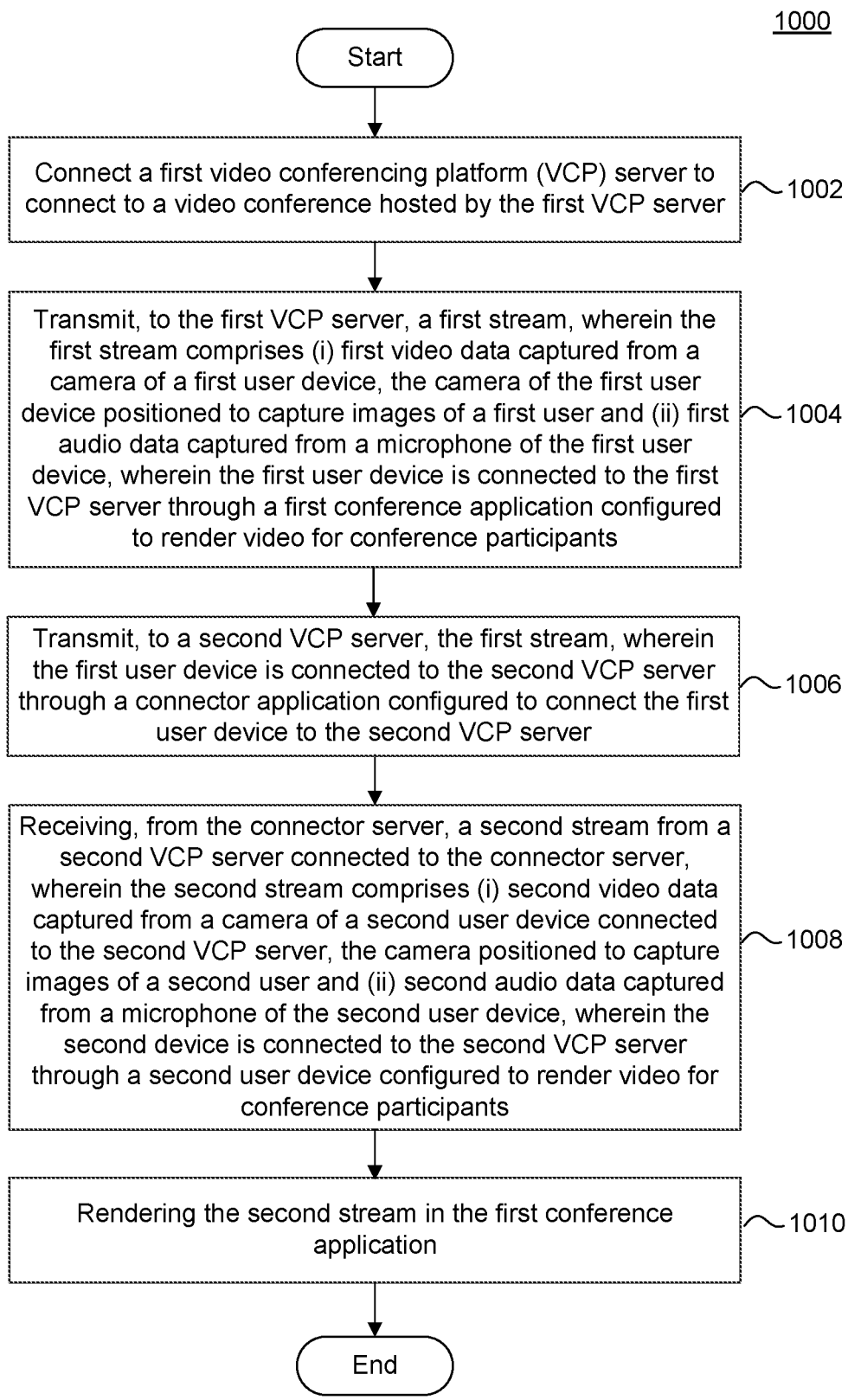
FIG. 10 is a flowchart illustrating a method for integrating multiple video conferencing platforms.

FIG. 9 is a flowchart illustrating a method 900 for integrating video conferences and 3D virtual environments, according to an aspect of the invention. It is to be appreciated that not all steps may be needed to perform the disclosure provided herein. Further, some of the steps can be performed simultaneously, or in a different order than shown in FIG. 9, as would be understood by a person of ordinary skill in the art.

Method 900 can be implemented by system 300 and operations caused by computer system 1200. Method 900 can be further understood with reference to FIGS. 5A-5C. However, method 900 is not limited to these example aspects.

In 902, a 3D virtual environment is rendered. The 3D virtual environment is rendered on a first user device (e.g., device 306A-B) of a first user and is viewable from a perspective of a first virtual camera. The first virtual camera is controllable by the first user. The 3D virtual environment includes a first avatar. The first avatar is a virtual representation of the first user at a location of the first virtual camera.

In some aspects, the user can control or navigate the location and direction of their avatar and virtual camera. The user can view, through their virtual camera, a perspective of avatars of other users (i.e., viewing another user's avatar, which can include a texture mapped video of the other user as described with reference to interface 100). Likewise, each user can hear sounds from the other users. From the perspective of any one of the user's virtual cameras, the avatars can exist in a certain clockwise ordering within the 3D virtual environment.

In 904, the first user device, within the 3D virtual environment, connects to a video conference platform (VCP) server (e.g., VCP server 502) to connect to a video conference hosted by the VCP server. The video conference may be scheduled by the first user device from within the 3D virtual environment or by a device using the VCP's scheduling system. The 3D virtual environment configures the connection between the VCP server and the first user device for scheduling and joining the video conference. In one aspect, the first user device may connect to the VCP server by inputting a URL into the 3D virtual environment. In one aspect, the first user device may connect to the VCP server when the first virtual camera, controlled by the first user, is determined to have entered a designated space for the video conference within the 3D virtual environment. The designated space may, for example, be a virtual conference room in the environment. Additionally or alternatively, the designated space may be a sound zone in the environment. A sound zone is a space in the three dimensional virtual environment such that users within the space can hear each other's audio, but user's outside the space cannot. In some aspects, a plurality of user devices within the 3D virtual environment may connect to the VCP server to connect to the video conference hosted by the VCP.

In 906, a virtual environment stream from the 3D virtual environment is transmitted to the VCP server. The virtual environment stream comprises video data captured from a camera of the first user device. The camera may be positioned to capture images of the first user. The virtual environment stream further comprises audio data captured from a microphone of the first user device. In some aspects, the virtual environment stream may indicate the user device is connecting through the 3D virtual environment. The virtual environment stream may also include screen share data, which is a screen share from the first user device, where a monitor or window is shared.

In the native experience, as exemplified in FIGS. 7A-D, the video data from the virtual environment stream is only the images captured from the camera. When a plurality of user devices within the 3D environment connect to the video conference, each user device transmits video data captured from its respective camera, as exemplified by users 706 and 708 in FIG. 7A.

In the hybrid experience, as exemplified in FIGS. 8A-C, the video data from the virtual environment stream is a rendering of the 3D environment from a perspective of a virtual camera. The virtual camera is positioned within the 3D virtual environment to capture the avatars of the other meeting participants. When a plurality of user devices within the 3D environment connect to the video conference, each user device's avatar may be captured by the virtual camera simultaneously, as exemplified by users 814 and 816 in FIG. 8A. Additionally, the virtual camera may be positioned to capture an area in the 3D virtual environment representing a conference room, as exemplified by 3D virtual environment 804 in FIG. 8A.

In 908, a video conference stream is received from the video conference hosted by the VCP server. The video conference stream includes video data captured from a camera of a second user device (e.g., device 504). The camera may be positioned to capture images of a second user. The video conference stream may also include audio data captured from a microphone of the second user device. The video conference stream may also include screen share data, which is a screen share from the second user device, where a monitor or window is shared. The second user device is connected to the VCP server through a conference application (e.g. conference application 512) that is configured to render video for conference participants two dimensionally.

In 910, the video conference stream is rendered in the 3D virtual environment. The video conference stream is rendered such that it is visible through the first virtual camera. In some aspects, the rendered video conference stream is only visible to the first virtual camera and audible to the first user when it is determined that the first user device has permission to connect to the video conference. When it is determined the first virtual camera does not have permission to connect to the video conference, the video conference stream may be rendered as a default icon or the area that the video conference is rendered into is obscured. For example, the designated area for the video conference may be obscured by virtually frosting the glass walls partitioning the designated area in the 3D virtual environment.

In the native experience, the video data from the video conference stream is rendered onto an avatar in the 3D virtual environment. The video data may be rendered by texture mapping the video data onto the avatar. Since the VCP user device is not connected to the video conference within the 3D virtual environment, the user captured in the video cannot control her avatar. Thus, the avatar will be automatically positioned in the 3D virtual environment. For example, the 3D virtual environment may include a model of a conference table. The avatar may be positioned and oriented at the conference table.

In an example of the native experience, the 3D virtual environment may automatically position the second avatar by determining a location within an area of space surrounding a point or object. The area of space can be considered a spacing natural to users in a real-world environment. For example, the object can be a conference table and the area of space can be an area surrounding the conference table where users would normally sit in a chair. Specifically, the area of space can be calculated based on a size of the object (e.g., a diameter), a size of the users' avatars, a distance between the object and the avatars, a size of the users' web browsers, and/or a size of the 3D virtual environment (e.g., a distance between virtual walls). The distance between the object and the avatars can be predetermined or dynamically calculated using the other possible inputs. If there are two users, the locations for each can be positioned opposite one another around the point or object. If there are more than two users, the locations for each can be positioned substantially equidistant from one another around the point or object. In an example, the locations may be determined by conference application 310A on a device 306A.

The positioning of the second avatar is exemplified in FIG. 7B. Users 704, 708, 712, and 714 are users that are not within the 3D virtual environment and are therefore automatically positioned around the conference table. User 710, which is within the 3D virtual environment, may also be positioned around the conference table when user 710 indicates to the 3D virtual environment to assemble their avatar at the conference table. When the video conference stream includes screen share data, the 3D virtual environment may render the screen share data as the 3D virtual environment is configured to render screen shares. For example, the screen share data may be texture mapped onto a presentation screen within the 3D virtual environment.

In the hybrid experience, the video data from the video conference stream may be rendered on a fixed position in the designated area. For example, the video data is rendered on a model of a screen (e.g., presentation screen) within the 3D virtual environment. When a plurality of user devices are connected to the video conference through the VCP server, the video data from each user is rendered in a grid interface on the screen. This is exemplified by users 806, 808, 810, and 812 in FIG. 8B. In one instance of the hybrid experience, the video conference stream may be presented on a grid interface in the 3D virtual environment, but a two dimensional view may be rendered over the 3D virtual environment. This view is exemplified by FIG. 8C. When the video conference stream includes screen share data, the 3D virtual environment may render screen share data from the video conference stream on the model of the screen.

As mentioned above, the user may enter the meeting when entering a sound zone. Similarly, when the user exits the sound zone, the user may exit the meeting. In other words, when the user exits the sound zone, the user's video and audio data is no longer transmitted to the VCP server and is no longer available to devices connected to the meeting through the VCP server. Additionally or alternatively, even though transmission of the video and audio data has stopped when exiting the sound zone, a connection from the user's device to the VCP server may still be maintained. In that way, the user may remain in the meeting, with her participation paused, while the user exits the sound zone. When the user reenters the sound zone, transmission of video and audio is resumed, allowing for participation in the meeting without having to reconnect.

Method 1000 can be implemented by system 300 and operations caused by computer system 1200. Method 1000 can be further understood with reference to FIGS. 6A-B. However, method 1000 is not limited to these example aspects.

In 1002, a first video conference platform (VCP) server (e.g., VCP server 604A-B) is connected to a video conference hosted by the first VCP server. The video conference may be scheduled by a user device using the first VCP server's scheduling system. In one aspect, the first VCP server is a server that renders video conferences in a 3D virtual environment. In one aspect, the first VCP server is a server that renders video conferences two dimensionally.

In 1004, a first stream is transmitted to the first VCP server from the first user device. The first stream includes video data captured from a camera of a first user device (e.g., device 606A-B). The camera may be positioned to capture images of a first user. The first stream may also include audio data captured from a microphone of the first user device. In some aspects, the first stream further comprises a name of the first user. The first stream may also include screen share data, which is a screen share from the first user device, where a monitor or window is shared. The first user device is connected to the first VCP server through a first conference application (e.g., conference application 310A or 512) that is configured to render video for conference participants.

In 1006, the first stream is transmitted to a second VCP server from the first user device. The first user device is connected to the second VCP server through a connector application (e.g., connector application 610A-B). The connector application is configured to connect the first user device to the second VCP server.

In 1008, a second stream is received from the second VCP server. The second stream includes video data captured from a camera of a second user device (e.g., device 606A-B). The camera may be positioned to capture images of a second user. The second stream may also include audio data captured from a microphone of the second user device. In some aspects, the second stream further comprises a name of the second user. The second stream may also include screen share data, which is a screen share from the second user device, where a monitor or window is shared. The second user device is connected to the second VCP server through a second conference application (e.g. conference application 310A or 512) that is configured to render video for conference participants. The second user is also connected to the connector application, which is configured to connect the second user device to the first VCP server.

In 1010, the video conference stream is rendered in the first conference application. If the first conference application is a 3D virtual environment, the video data may be rendered as described in step 910 of FIG. 9.

Figure 11:
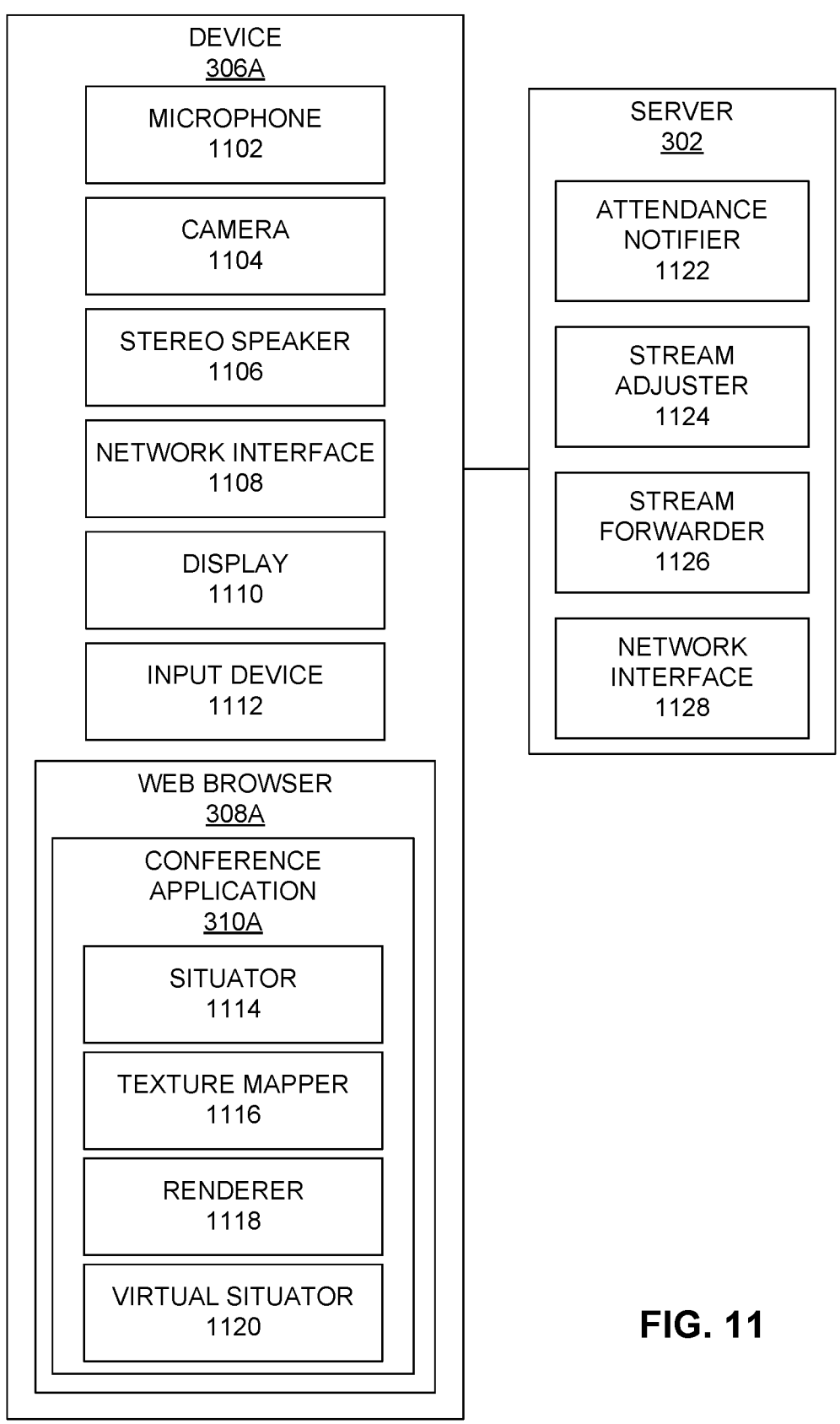
FIG. 11 is a diagram illustrating components of devices used to provide video conferencing within a virtual environment.

Device Components and Computer Systems for Video Conferencing in a Virtual Environment FIG. 11 is a diagram of a system 1100 illustrating components of devices used to provide video conferencing within a virtual environment. In various aspects, system 1100 can operate according to the methods described above.

Device 306A is a user computing device. Device 306A could be a desktop or laptop computer, smartphone, tablet, or wearable device (e.g., watch or head mounted device). Device 306A includes a microphone 1102, camera 1104, stereo speaker 1106, and input device 1112. Not shown, device 306A also includes a processor and persistent, non-transitory and volatile memory. The processors can include one or more central processing units, graphic processing units or any combination thereof.

Microphone 1102 converts sound into an electrical signal. Microphone 1102 is positioned to capture speech of a user of device 306A. In different examples, microphone 1102 could be a condenser microphone, electret microphone, moving-coil microphone, ribbon microphone, carbon microphone, piezo microphone, fiber-optic microphone, laser microphone, water microphone, or MEMs microphone.

Camera 1104 captures image data by capturing light, generally through one or more lenses. Camera 1104 is positioned to capture photographic images of a user of device 306A. Camera 1104 includes an image sensor (not shown). The image sensor may, for example, be a charge coupled device (CCD) sensor or a complementary metal oxide semiconductor (CMOS) sensor. The image sensor may include one or more photodetectors that detect light and convert it to electrical signals. These electrical signals captured together in a similar timeframe comprise a still photographic image. A sequence of still photographic images captured at regular intervals together comprise a video. In this way, camera 1104 captures images and videos.

Stereo speaker 1106 is a device which converts an electrical audio signal into a corresponding left-right sound. Stereo speaker 1106 outputs the left audio stream and the right audio stream generated by an audio processor to be played to device 306A's user. Stereo speaker 1106 includes both ambient speakers and headphones that are designed to play sound directly into a user's left and right ears. Example speakers include moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 1108 is a software or hardware interface between two pieces of equipment or protocol layers in a computer network. Network interface 1108 receives a video stream from server 302 for respective participants for the meeting. The video stream is captured from a camera on a device of another participant to the video conference. Network interface 1108 also receives data specifying a three-dimensional virtual space and any models therein from server 302. For each of the other participants, network interface 1108 receives a position and direction in the three-dimensional virtual space. The position and direction are input by each of the respective other participants.

Network interface 1108 also transmits data to server 302. It transmits the position of device 306A's user's virtual camera used by renderer 1118 and it transmits video and audio streams from camera 1104 and microphone 1102.

Display 1110 is an output device for presentation of electronic information in visual or tactile form (the latter used for example in tactile electronic displays for blind people). Display 1110 could be a television set, computer monitor, head-mounted display, heads-up displays, output of an augmented reality or virtual reality headset, broadcast reference monitor, medical monitors mobile displays (for mobile devices), or Smartphone displays (for smartphones). To present the information, display 1110 may include an electroluminescent (ELD) display, liquid crystal display (LCD), light-emitting diode (LED) backlit LCD, thin-film transistor (TFT) LCD, light-emitting diode (LED) display, organic light-emitting diode (OLED) display, active-matrix organic light-emitting diode (AMOLED) display, plasma (PDP) display, or quantum dot (QLED) display.

Input device 1112 is a piece of equipment used to provide data and control signals to an information processing system such as a computer or information appliance. Input device 1112 allows a user to input a new desired position of a virtual camera used by renderer 1118, thereby enabling navigation in the three-dimensional environment. Examples of input devices include keyboards, mouse, scanners, joysticks, and touchscreens.

Web browser 308A and conference application 310A were described above with respect to FIG. 3. Conference application 310A includes situator 1114, texture mapper 1116, renderer 1118, and virtual situator 1120.

Situator 1114 selects locations within a virtual environment, repositions and resituates avatars and virtual cameras to the selected locations within the virtual environment, and sends instructions to various user devices (e.g., device 306A). Situator 1114 allows a user, through display 1110, to better interact with other users by arranging the other users' avatars around a virtual object rendered by renderer 1118 within the virtual environment. Situator 1114 also communications with other user devices so that the other users' perspectives, through their virtual cameras, are adjusted similarly.

Texture mapper 1116 texture maps the video stream onto a three-dimensional model corresponding to an avatar. Texture mapper 1116 may texture map respective frames from the video to the avatar. In addition, texture mapper 1116 may texture map a presentation stream to a three-dimensional model of a presentation screen.

Renderer 1118 renders, from a perspective of a virtual camera of the user of device 306A, for output to display 1110 the three-dimensional virtual space including the texture-mapped three-dimensional models of the avatars for respective participants located at the received, corresponding position and oriented in the direction. Renderer 1118 also renders any other three-dimensional models including for example the presentation screen.

Virtual situator 1120 determines new locations for perceived representations of user avatars (e.g., perceived avatars) and resituates the perceived avatars to the new locations. Virtual situator 1120 allows a user, through display

1110, to better interact with other users by arranging the other users' perceived avatars within the user's field of view.

Server 302 includes an attendance notifier 1122, a stream adjuster 1124, and a stream forwarder 1126.

Attendance notifier 1122 notifies conference participants when participants join and leave the meeting. When a new participant joins the meeting, attendance notifier 1122 sends a message to the devices of the other participants to the conference indicating that a new participant has joined. Attendance notifier 1122 signals stream forwarder 1126 to start forwarding video, audio, and position/direction information to the other participants.

Stream adjuster 1124 receives a video stream captured from a camera on a device of a first user. Stream adjuster 1124 determines an available bandwidth to transmit data for the virtual conference to the second user. It determines a distance between a first user and a second user in a virtual conference space. And, it apportions the available bandwidth between the first video stream and the second video stream based on the relative distance. In this way, stream adjuster 1124 prioritizes video streams of closer users over video streams from farther ones. Additionally or alternatively, stream adjuster 1124 may be located on device 306A, perhaps as part of conference application 310A.

Stream forwarder 1126 broadcasts position/direction information, video, audio, and screen share screens received (with adjustments made by stream adjuster 1124). Stream forwarder 1126 may send information to the device 306A in response to a request from conference application 310A. Conference application 310A may send that request in response to the notification from attendance notifier 1122.

Network interface 1128 is a software or hardware interface between two pieces of equipment or protocol layers in a computer network. Network interface 1128 transmits the model information to devices of the various participants. Network interface 1128 receives video, audio, and screen share screens from the various participants.

Situator 1114, texture mapper 1116, renderer 1118, virtual situator 1120, attendance notifier 1122, stream adjuster 1124, and stream forwarder 1126 can each be implemented in hardware, software, firmware, or any combination thereof.

System 1100 can also include a screen capturer, configured to capture a presentation stream, and an audio processor, configured to adjust volume of the received audio stream.

Figure 12:
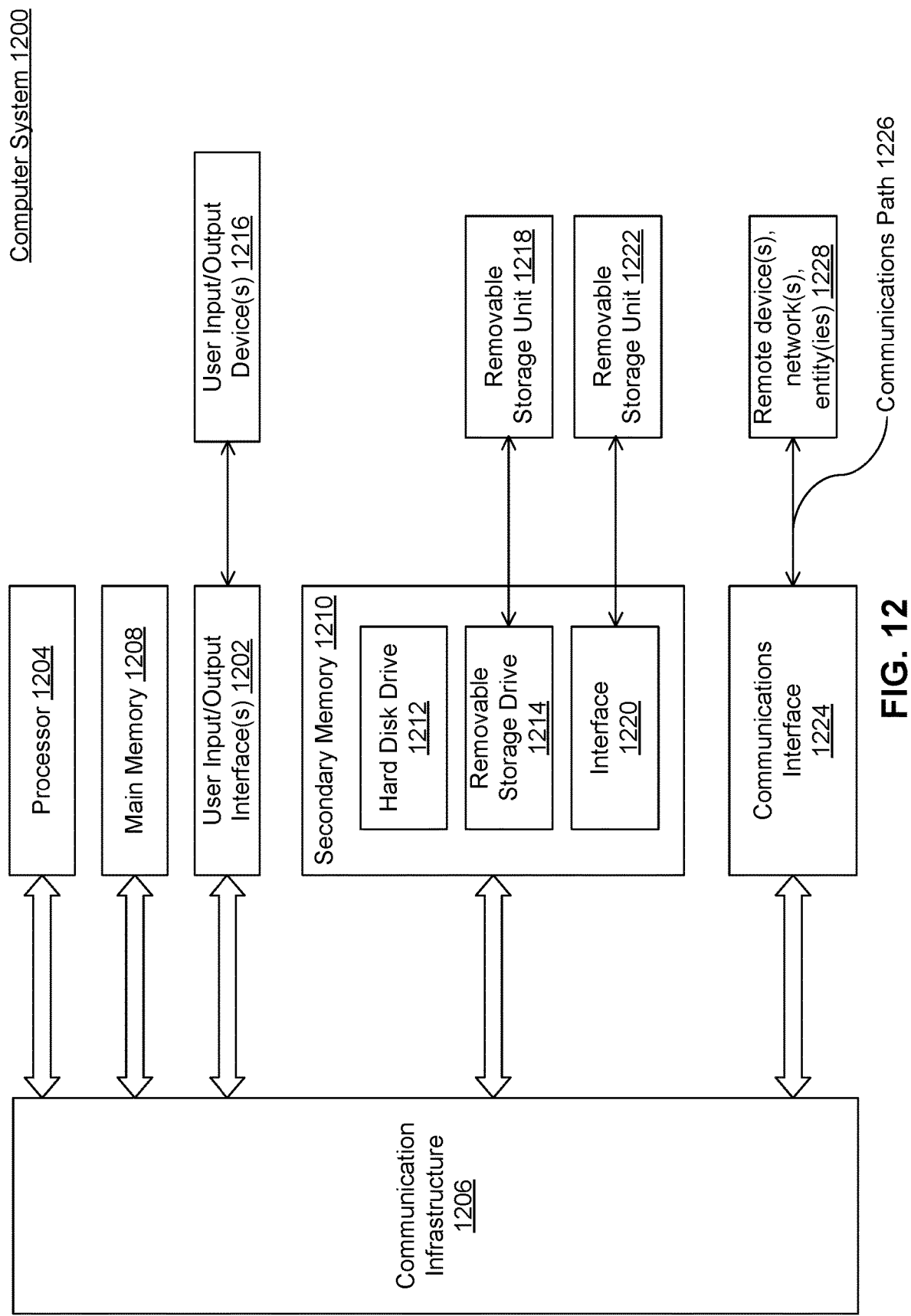
FIG. 12 is a block diagram of an example computer system useful for implementing various aspects.

Various aspects can be implemented, for example, using one or more computer systems, such as computer system 1200 shown in FIG. 12. Computer system 1200 can be used, for example, to implement a system for resituating virtual cameras and avatars in a virtual environment. For example, computer system 1200 can render a three-dimensional virtual environment, position and resituate virtual cameras, and generate and resituate perceived avatars corresponding to user avatars. Computer system 1200 can be any computer capable of performing the functions described herein.

Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1216, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or secondary memory 1210. Secondary memory 1210 may include, for example, a hard disk drive 1212 and/or a removable storage device or removable storage drive 1214. Removable storage drive 1214 may be a floppy disk drive, a magnetic tape drive, a compact disk drive, an optical storage device, a tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/or any other computer data storage device. Removable storage drive 1214 reads from and/or writes to removable storage unit 1218 in a well-known manner.

According to an exemplary aspect, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it would be apparent to persons skilled in the relevant art(s) how to make and use aspects of this disclosure using data processing devices, computer systems and/or computer architectures other than that shown in FIG. 12. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary aspects, but should be defined only in accordance with the following claims and their equivalents.

What is claimed is:

1. A computer implemented method, comprising:
   rendering, on a first user device of a first user from a perspective of a first virtual camera controlled by the first user, a three-dimensional (3D) virtual environment that includes a first avatar representing the first user at a location of the first virtual camera;
   connecting to a video conferencing platform (VCP) server to connect to a video conference hosted by the VCP server;
   transmitting, to the VCP server, a virtual environment stream from the 3D virtual environment, wherein the virtual environment stream comprises (i) first video data captured from a camera of the first user device, the camera of the first user device positioned to capture images of the first user and (ii) first audio data captured from a microphone of the first user device;
   receiving, from the VCP server, a video conference stream from the video conference hosted by the VCP server, wherein the video conference stream comprises (i) second video data captured from a camera of a second user device, the camera of the second user device positioned to capture images of a second user and (ii) second audio data captured from a microphone of the second user device, wherein the second user device is connected to the VCP server through a conference application configured to render video for conference participants two dimensionally; and
   rendering the video conference stream in the 3D virtual environment, wherein the video conference stream is visible through the first virtual camera, the rendering comprising:
      rendering the second video data on a second avatar in the 3D virtual environment;
      positioning the second avatar in the 3D virtual environment such that the second avatar is captured by the first virtual camera.

2. The computer implemented method of claim 1, wherein the 3D virtual environment includes a model of a conference table, wherein the first virtual camera is situated at the conference table and wherein the positioning comprises positioning and orienting the second avatar at the conference table.

3. The computer implemented method of claim 1, wherein the second video data is rendered on a model of a screen within the 3D virtual environment.

4. The computer implemented method of claim 1, further comprising:
   determining when the first virtual camera enters a designated space in the 3D virtual environment, a position of the first virtual camera within the 3D virtual environment controlled by the first user; and
   when the first virtual camera is determined to enter the designated space, connecting to the video conference to start receiving the video conference stream.

5. The computer implemented method of claim 1, further comprising:
   determining whether the first user device has permission to connect to the video conference, wherein the rendering renders the 3D virtual environment such that the video conference stream is only visible to the first virtual camera in the 3D virtual environment when the first user device has the permission.

6. The computer implemented method of claim 1, wherein the conference application displays the video conference stream and the virtual environment stream in a 2D interface.

7. A computer-readable non-transitory storage medium comprising instructions which, when executed by a computer, cause the computer to carry out operations, the operations comprising:
   rendering, on a first user device of a first user from a perspective of a first virtual camera controlled by the first user, a three-dimensional (3D) virtual environment that includes a first avatar representing the first user at a location of the first virtual camera;

connecting to a video conferencing platform (VCP) server to connect to a video conference hosted by the VCP server;

transmitting, to the VCP server, a virtual environment stream from the 3D virtual environment, wherein the virtual environment stream comprises (i) first video data captured from a camera of the first user device, the camera of the first user device positioned to capture images of the first user and (ii) first audio data captured from a microphone of the first user device;

receiving, from the VCP server, a video conference stream from the video conference hosted by the VCP server, wherein the video conference stream comprises (i) second video data captured from a camera of a second user device, the camera of the second user device positioned to capture images of a second user and (ii) second audio data captured from a microphone of the second user device, wherein the second user device is connected to the VCP server through a conference application configured to render video for conference participants two dimensionally; and rendering the video conference stream in the 3D virtual environment, wherein the video conference stream is visible through the first virtual camera, the rendering comprising:

rendering the second video data on a second avatar in the 3D virtual environment;

positioning the second avatar in the 3D virtual environment such that the second avatar is captured by the first virtual camera.

8. The computer-readable non-transitory storage medium of claim 7, wherein the 3D virtual environment includes a model of a conference table, wherein the first virtual camera is situated at the conference table and wherein the positioning comprises positioning and orienting the second avatar at the conference table.

9. The computer-readable non-transitory storage medium of claim 7, wherein a second virtual camera is positioned to capture an area in the 3D virtual environment representing a conference room.

10. The computer-readable non-transitory storage medium of claim 7, wherein the second video data is rendered on a model of a screen within the 3D virtual environment.

11. The computer-readable non-transitory storage medium of claim 7, further comprising:

determining when the first virtual camera enters a designated space in the 3D virtual environment, a position of the first virtual camera within the 3D virtual environment controlled by the first user; and when the first virtual camera is determined to enter the designated space, connecting to the video conference to start receiving the video conference stream.

12. The computer-readable non-transitory storage medium of claim 7, further comprising:

determining whether the first user device has permission to connect to the video conference, wherein the rendering renders the 3D virtual environment such that the video conference stream is only visible to the first virtual camera in the 3D virtual environment when the first user device has the permission.

13. The computer-readable non-transitory storage medium of claim 7, wherein the conference application displays the video conference stream and the virtual environment stream in a 2D interface.

14. A computer implemented method, comprising:

connecting to a first video conferencing platform (VCP) server to connect to a video conference hosted by the first VCP server;

transmitting, to the first VCP server, a first stream, wherein the first stream comprises (i) first video data captured from a camera of a first user device, the camera of the first user device positioned to capture images of a first user and (ii) first audio data captured from a microphone of the first user device, wherein the first user device is connected to the first VCP server through a first conference application configured to render video for conference participants;

transmitting, to a second VCP server, the first stream, wherein the first user device is connected to the second VCP server through a connector application configured to connect the first user device to the second VCP server;

receiving, from the second VCP server, a second stream, wherein the second stream comprises (i) second video data captured from a camera of a second user device connected to the second VCP server, the camera of the second user device positioned to capture images of a second user and (ii) second audio data captured from a microphone of the second user device, wherein the second user device is connected to the second VCP server through a second conference application configured to render video for conference participants and the second user device is connected to the connector application configured to connect the second user device to the first VCP server; and rendering the second stream in the first conference application, the rendering comprising:

rendering the second video data on a second avatar in a 3D virtual environment;

positioning the second avatar in the 3D virtual environment such that the second avatar is captured by a first virtual camera.

15. A computer implemented method, comprising:

rendering, on a first user device of a first user from a perspective of a first virtual camera controlled by the first user, a three-dimensional (3D) virtual environment that includes a first avatar representing the first user at a location of the first virtual camera;

connecting to a video conferencing platform (VCP) server to connect to a video conference hosted by the VCP server;

rendering the 3D virtual environment from a perspective of a second virtual camera to produce a virtual environment stream, the second virtual camera positioned within the 3D virtual environment to capture the first avatar, wherein the virtual environment stream comprises (i) first video data captured from a camera of the first user device, the camera of the first user device positioned to capture images of the first user and (ii) first audio data captured from a microphone of the first user device;

transmitting the virtual environment stream to the VCP server;

receiving, from the VCP server, a video conference stream from the video conference hosted by the VCP server, wherein the video conference stream comprises (i) second video data captured from a camera of a second user device, the camera of the second user device positioned to capture images of a second user and (ii)

second audio data captured from a microphone of the second user device, wherein the second user device is connected to the VCP server through a conference application configured to render video for conference participants two dimensionally; and rendering the video conference stream in the 3D virtual environment, wherein the video conference stream is visible through the first virtual camera.

16. The computer implemented method of claim 15, wherein the second virtual camera is positioned to capture an area in the 3D virtual environment representing a conference room.

17. The computer implemented method of claim 15, wherein the second video data is rendered on a model of a screen within the 3D virtual environment.

18. The computer implemented method of claim 15, further comprising:

determining when the first virtual camera enters a designated space in the 3D virtual environment, a position of the first virtual camera within the 3D virtual environment controlled by the first user; and when the first virtual camera is determined to enter the designated space, connecting to the video conference to start receiving the video conference stream.

19. The computer implemented method of claim 15, further comprising:

determining whether the first user device has permission to connect to the video conference, wherein the rendering renders the 3D virtual environment such that the video conference stream is only visible to the first virtual camera in the 3D virtual environment when the first user device has the permission.

20. The computer implemented method of claim 15, wherein the conference application displays the video conference stream and the virtual environment stream in a 2D interface.

* * * * *